United States Patent [19]

McTaggart et al.

[11] Patent Number: 5,462,730

[45] Date of Patent: Oct. 31, 1995

[54] CROSS-LINKED QUATERNARY AMONONIUM DERIVATIVES OF POLY(N, N-DIALKYLALLYL) AMMONIUM POLYMERS

[75] Inventors: Fergus McTaggart, Wilmslow; Denis Pemberton, Stockport; Graham J. Smith, Macclesfield, all of United Kingdom

[73] Assignee: Imperial Chemical Industries PLC, London, England

[21] Appl. No.: 252,521

[22] Filed: Jun. 1, 1994

Related U.S. Application Data

[63] Continuation of Ser. No. 804,131, Dec. 6, 1991, abandoned.

[30] Foreign Application Priority Data

Dec. 4, 1990 [GB] United Kingdom .................... 9026616
May 10, 1991 [GB] United Kingdom .................... 9110180

[51] Int. Cl.$^6$ .......................... A61K 31/785; C08F 8/02; C08F 126/02; C08J 3/24
[52] U.S. Cl. .................... 424/78.35; 424/78.18; 424/78.12; 424/439; 424/441; 424/456; 514/824; 525/329.1
[58] Field of Search ............... 424/78.35, 78.18, 424/78.01, 439, 45, 440, 469; 525/329.1

[56] References Cited

U.S. PATENT DOCUMENTS 4,167,610  9/1979  Bolto et al. .................... 521/31

FOREIGN PATENT DOCUMENTS 296622  12/1988  European Pat. Off. .
334673   9/1989  European Pat. Off. .
375350   6/1990  European Pat. Off. .
400848  12/1990  European Pat. Off. .
432995   6/1991  European Pat. Off. .

*Primary Examiner*—Edward J. Webman
*Attorney, Agent, or Firm*—Cushman Darby & Cushman

[57] ABSTRACT

The invention concerns novel cross-linked poly(N,N-dialkylallyl)ammonium polymer materials containing quaternary propylammonium structural units which are effective in lowering elevated plasma levels of low density lipoproteins and lipoid components thereof, such as cholesterol, and which are of value in the treatment of conditions in which such elevated plasma levels are associated, for example, various vascular diseases. The invention also provides methods for the manufacture of the polymer materials and various intermediates for use in such manufacture.

4 Claims, No Drawings

CROSS-LINKED QUATERNARY AMONONIUM DERIVATIVES OF POLY(N, N-DIALKYLALLYL) AMMONIUM POLYMERS

This is a continuation of application Ser. No. 07/804,131, filed on Dec. 6, 1991, which was abandoned upon the filing hereof.

TECHNICAL FIELD

This invention concerns novel nitrogen derivatives and, more particularly, novel polymeric materials which contain quaternary ammonium groups, which materials are valuable in the reduction of elevated levels in blood plasma of low density lipoproteins (LDL) and lipid components thereof such as cholesterol. Such elevated levels of LDL and cholesterol are frequently associated with vascular disease and related conditions, such as atherosclerosis and coronary heart disease. The invention also provides processes for the manufacture of, and pharmaceutical compositions containing the novel nitrogen derivatives, as well as therapeutic and/or prophylactic methods of treatment by administering the nitrogen derivatives.

BACKGROUND TO THE INVENTION

A number of agents are well known to reduce elevated levels of LDL and cholesterol, for example hypocholesterolaemic agents such as clofibrate, 3-hydroxy-3-methylglutaryl coenzyme A (HMG-CoA) reductase inhibitors such as simvastatin and fluvastatin as well as agents which act by complexing with bile acids in the intestinal system. Illustrative of such latter agents is that known as cholestyramine described, inter alia, in UK patent Ser. No. 929,391 and which is a cross-linked polystyrene resin in which a proportion of the styrene units bear an ionic trimethylammonium group. It is believed that many of such agents act by sequestering bile acids within the intestinal tract, thus lowering levels of bile acid circulating in the enterohepatic system and promoting replacement of bile acids by synthesis in the liver from cholesterol, which synthesis results, inter alia, in a lowering of circulating blood cholesterol levels. The use of bile acid sequestering agents such as cholestyramine and colestipol in treating conditions such as familial hypercholesterolaemia is known, as is their use in preventing or limiting the progression of diseases such as coronary heart disease associated with high levels of blood lipids such as cholesterol, and in alleviating adverse conditions affecting the intestinal tract such as diarrhea. However, there is a continuing need for new alternative agents, in particular because many of the existing agents are not particularly potent and produce adverse side-effects. Thus, it is frequently necessary to administer comparatively large amounts (up to 25 g daily) of presently available polymeric agents, such as cholestyramine and colestipol, to produce a beneficial effect. Patient compliance with dosing regimes involving such large amounts of relatively unpalatable polymeric agents is difficult to achieve.

Insoluble poly(allylamine) polymeric materials have been known for some time, for example as described in European patent application, publication no. 143,328 pending. However, they have not previously been known to be of value as pharmaceutical agents. We have now discovered, and this is a basis for our invention, that a series of novel, polymeric allylamine derivatives containing quaternary ammonium groups possess useful activity in reducing plasma sterol levels (for example, cholesterol levels) at relatively low doses and with a reduced propensity towards the production of significant side-effects.

DISCLOSURE OF THE INVENTION

According to the invention there is provided an insoluble, swellable polymeric allylammonium derivative (D1) comprising in essentially random order:

(i) at least 10 mole percent of quaternary propylammonium structural units of the empirical formula I (set out hereinafter) wherein one of $R^1$, $R^2$ and $R^3$ is (1–16C)alkyl (4–12C)cycloalkyl or phenyl-(1–4C)alkyl, the latter phenyl moiety optionally bearing one or two substituents, independently selected from halogeno, (1–4C)alkyl and (1–4C)alkoxy; another of $R^1$, $R^2$ and $R^3$ is (1–4C)alkyl; and the other of $R^1$, $R^2$ and $R^3$ is (1–4C)alkyl optionally bearing a carbamoyl substituent, or is (2–4C)alkyl bearing a hydroxy substituent on other than an α-carbon atom; and Y is a physiologically acceptable anion;

(ii) about 0.5 to 10 mole percent of cross-linking structural units substantially of the empirical formula IIa and/or IIb (set out hereinafter) wherein $R^5$, $R^6$, $R^7$ and $R^8$ are independently hydrogen or one of the values of $R^1$, $R^2$ and $R^3$ defined above; one of $R^9$ and $R^{10}$ is hydrogen or (1–4C)alkyl and the other of $R^9$ and $R^{10}$ has one of the values of $R^1$, $R^2$ and $R^3$ defined above; Y has the meaning defined above; and X is a cross-linking group; and (iii) the remainder substantially of structural propylamino units of the empirical formula III (set out hereinafter) wherein $R^{11}$ and $R^{12}$ are independently hydrogen or one of the values of $R^1$, $R^2$ and $R^3$ defined above, and Y has the meaning defined above; and said derivative D1 having the property of swelling in volume in at least one of water, 0.15M aqueous sodium chloride solution, and ethanol by between about 2 and 200 times.

It will be understood that the polymeric allylammonium derivatives D1 can have an indeterminately high molecular weight since cross-linking produces a polymer matrix including the repeating structural units of formula IIa and/or IIb. It will also be understood that the cross-linking groups within any particular polymeric allylammonium derivative D1 of the invention may be the same or different structural units of the empirical formula IIa or IIb, that is they may differ in the degree of substitution on the nitrogen atoms. Further, it will be understood that the polymeric allylammonium derivatives D1 may include quaternary propylammonium structural units of empirical formula I which have different combinations of values for $R^1$, $R^2$ and $R^3$ In addition, although the structural units IIa, IIb and III depict the nitrogen atoms in a quaternary cationic configuration, it will be apparent to those skilled in the art that as a result of steric and inductive factors the derivatives D1 may also contain a small proportion of analogous structural units in which a nitrogen atom may be present as a free, uncharged primary, secondary or tertiary amino group, that is in which no anion Y is present.

Illustrative values for $R^1$, $R^2$ and $R^3$ include for example: for (1–16C)alkyl, methyl, ethyl, propyl, butyl, isobutyl, sec-butyl, pentyl, 1-methylbutyl, 2-methylbutyl, 3-methylbutyl, hexyl, heptyl, octyl, nonyl, decyl, undecyl, dodecyl and tetradecyl [of which values, methyl, butyl, 3-methylbutyl, hexyl, octyl and dodecyl of are particular interest];

for (1–4C)alkyl, methyl, ethyl, propyl and butyl;

for (1–4C)alkyl optionally bearing carbamoyl, methyl, ethyl, propyl and butyl optionally bearing a carbamoyl substituent;

for (2–4C)alkyl bearing a hydroxy substituent on other than an α-carbon atom, 2-hydroxyethyl, 3-hydroxypropyl and 4-hydroxybutyl;

for cycloalkyl, cyclobutyl, cyclopentyl, cyclohexyl, cyclo-octyl and cyclododecyl; and for phenylalkyl, benzyl, 1-phenylethyl, 2-phenylethyl and 3-phenylpropyl.

Particular values for $R^8$ or $R^9$ when it is (1–4C)alkyl are, for example, methyl ethyl or propyl.

Particular substituents which may be present on a phenyl group when one of $R^1$, $R^2$ and $R^3$ is phenylalkyl include for example: for halogeno, fluoro, chloro and bromo; for alkyl, methyl, ethyl and isopropyl; and for alkoxy, methoxy and ethoxy.

Preferred values for $R^1$, $R^2$ and $R^3$ include, for example when one is methyl, butyl, hexyl, 3-methylbutyl, octyl, dodecyl or benzyl, and the others are methyl.

A specific group of values for the cross-linking group X includes, for example: polymethylene of up to 14 carbon atoms (such as trimethylene, tetramethylene, hexamethylene, octamethylene, decamethylene and dodecamethylene), optionally containing one or more hydroxy substituents (such as 2-hydroxytrimethylene and 2,7-dihydroxyoctamethylene); and poly(ethyleneoxy)ethylene of the formula —[$CH_2CH_2O$]$_n CH_2CH_2$— in which n is an integer from 1 to 6 (such as tri(ethyleneoxy)ethylene). Particularly preferred values for X include, for example, trimethylene, 2-hydroxytrimethylene and dodecamethylene.

Particular values for the physiologically acceptable anion Y include, for example, ions from strong acids such as halide (especially chloride), sulphate and phosphate, as well as ions from organic acids such as acetate, propionate, lactate, citrate, tartrate and gluconate.

One particular group of polymeric allylammonium derivatives D2 of the invention comprises derivatives D1 as defined above wherein the total amount of quaternary substituted amino containing units of the empirical structural formula I, IIa and/or IIb constitutes at least 15 mole percent of the polymeric allylammonium derivative.

A further particular group of polymeric allylammonium derivatives D3 of the invention comprises derivatives D1 or D2 as defined above wherein in addition in at least 75% of the structural units of formula I the group —$NR^1(R^2)(R^3)$ is selected from —$N(CH_3)_3$, —$N(CH_3)_2(butyl)$, —$N(CH_3)_2(hexyl)$, —$N(CH_3)_2(3\text{-methylbutyl})$, —$N(CH_3)_2(benzyl)$, —$N(CH_3)_2(octyl)$ and —$N(CH_3)_2(dodecyl)$.

A preferred value for the linking group X in empirical formula IIa is, for example, trimethylene or dodecamethylene.

Preferred polymeric amine derivatives will generally swell in volume in at least one of water, 0.15M aqueous sodium chloride solution, and ethanol, by, for example, about 3 to 75 times.

One preferred group of polymeric allylammonium derivatives D4 of the invention includes insoluble, swellable polymeric allylammonium derivatives comprising in essentially random order:

(i) at least 60 mole percent of quaternary propylammonium structural units of the empirical formula I in which the group —$NR^1(R^2)(R^3)$ may be —$N(CH_3)_3$, —$N(CH_3)_2(butyl)$, —$N(CH_3)_2(hexyl)$, —$N(CH_3)_2(octyl)$ or —$N(CH_3)_2(dodecyl)$;

(ii) about 3 to 8 mole percent of cross-linking structural units substantially of the empirical formula IIa in which the group of the formula —$N(R^5)(R^6)$—X—$N(R^7)(R^8)$— may be —$N(CH_3)_2.CH_2.CH_2.CH_2.N(CH_3)2$—, —$NH(CH_3).CH_2.CH_2.CH_2.N(CH_3)_2$— or —$NH(CH_3).CH_2.CH_2.CH_2.NH(CH_3)$—; and (iii) the remainder substantially of propylamino structural units of the empirical formula III in which the group —$NH(R^{11})(R^{12})$ is —$NH(CH_3)_2$;

Y is halide (especially chloride) or a physiologically acceptable organic acid anion (especially citrate);

and which derivatives have the property of swelling in volume in at least one of water, 0.15M aqueous sodium chloride and ethanol by about 3 to 30 times.

The corresponding free base forms of the polymeric allylammonium derivatives D1, D2, D3 and D4 may be readily obtained from the corresponding salt forms by removal of the acid corresponding to the anion Y, for example by treatment with a strong base, for example an alkali metal hydroxide such as sodium hydroxide. Although the polymeric allylammonium derivatives of the invention are generally more stable and easily isolable as the salt forms defined hereinabove, the corresponding free base forms of the polymeric allylammonium derivatives D1, D2, D3 and D4 are also useful, for example when it is required to produce a salt containing an alternative anion by reaction with the appropriate acid of the formula HY where Y has the meaning defined above, and are included as a feature of the invention.

It will be recognised that, for the free base form of the polymeric allylammonium derivatives D1, the anion Y will be hydroxide. It will be understood that, in such free base forms:

(a) cross-linking groups of empirical formula IIa may themselves contain one or two quaternary ammonium hydroxide groups, or secondary or tertiary amino groups;

(b) cross-linking groups of empirical formula IIb may themselves contain a quaternary ammonium hydroxide group, or a tertiary amino group; and (c) propylamino groups of empirical formula III may themselves contain a primary, secondary or tertiary amino group;

in each case depending on the nature of the substituents $R^5$ to $R^{12}$ therein.

Typical polymeric allylammonium derivatives of the invention are described in the accompanying Examples. Of these, derivatives of particular interest include, for example, those produced by the procedures described in Example 2, 36, 38, 48, 52 and 58, which derivatives are provided either as the indicated chloride salt form (or as an alternative salt form) as a further feature of the invention.

The polymeric allylammonium derivatives of the invention may be manufactured by standard procedures well known in the art for the production of analogous polymeric amines. The invention further provides a process for the manufacture of a polymeric allylammonium derivative as defined above using such an analogous procedure.

One preferred process of the invention is characterised by alkylating a cross-linked poly(allylamine) derivative (E) which comprises in essentially random order:

(i) at least 10 mole percent of secondary and/or tertiary substituted propylamino structural units of the empirical formula (IV) [set out hereinafter] wherein one of $R^{13}$ and $R^{14}$ is (1–16C)alkyl, (4–12C)cycloalkyl or phenyl(1–4C)alkyl optionally substituted as defined above, and the other of $R^{13}$ and $R^{14}$ is hydrogen, (1–4C)alkyl optionally bearing a carbamoyl, or (2–4C)alkyl bearing a hydroxy substituent on other than an α-carbon atom;

(ii) about 0.5 to 10 mole percent of cross-linking structural units substantially of the empirical formula Va, Vb and/or Vc [set out hereinafter] wherein $R^{15}$ $R^{16}$ and $R^{17}$ are independently hydrogen or one of the values of $R^{13}$ and $R^{14}$ defined in (i) above, and $R^{18}$, $R^{19}$, $R^{20}$ and $R^{21}$, independently, have any of the values of $R^{13}$ and $R^{14}$ defined in (i) above except hydrogen, and, in formula Vc, Y is an anion; and (iii) the remainder substantially of structural propylamino units of the formula VI [set out hereinafter] wherein $R^{22}$ has one of the values of $R^{13}$ and $R^{14}$ defined above apart from hydrogen; by reaction with a suitable alkylating agent; whereby at least 10 mole percent of quaternary substituted amino groups as defined above for D1, D2, D3 or D4, is introduced therein.

Specific values for the generic radicals $R^{13}$–$R^{22}$ and the anion Y include, for example, those given for the analogous generic radicals defined for D1, D2, D3 and D4 above.

The invention further provides a polymeric allylammonium derivative produced by carrying out the above process, or by an obvious chemical variation thereof, for example as is illustrated in the Examples hereinafter. One such variation which may be conveniently employed when differently substituted quaternary amino groups are required in the polymeric allylammonium derivative D1, D2, D3 or D4 is to carry out the alkylation in two stages using first one and then the other required alkylating agent, for example first using appropriate amounts of the higher molecular weight alkylating agent and then of the lower molecular weight alkylating agent.

It will be understood that in the present specification the term "alkylation" embraces the introduction of alkyl, cycloalkyl and phenylalkyl groups. The alkylation may be performed by any standard alkylation procedure well-known in the chemical art, for example, by reaction with the appropriate alkyl, cycloalkyl or phenylalkyl bromide or iodide, or with an analogous alkylating agent such as a dialkyl sulphate, to give the corresponding polymeric allylammonium derivative in which Y is bromide or iodide, (or sulphate or alkylsulphato when a dialkyl sulphate is used as the alkylating agent). The alkylation process is conveniently carried out in the presence of a suitable solvent or diluent, for example, ethanol, propanol or N, N-dimethylformamide and at a temperature in the range 20° to 80° C.

It will be appreciated that when a different anion is required than is produced in the alkylation reaction, this anion may be obtained, for example, by reacting said polymeric allylammonium derivative with a solution of a suitable salt of the formula $M.Y^1$ in which M is an alkali metal or alkaline earth metal (especially sodium or potassium) and $Y^1$ is the anion. Alternatively, the polymeric allylammonium derivative may be converted to its free base form, for example, by reaction with a solution of an alkali metal hydroxide such as sodium or potassium hydroxide, which free base form may then be reacted with the appropriate acid $H.Y^1$ in which $Y^1$ is the desired anion.

The starting cross-linked poly(allylamine) derivatives E are provided as a still further feature of the invention and may be made by a number of alternative procedures, for example, as are described in the accompanying Examples. Typical procedures include the following:

(a) The reaction of a linear poly(allylamine) of the formula VII in which m is an integer and of an average molecular weight in the range about 7000 to 85000, with an aldehyde of the formula $R^{23}$ CMO wherein $R^{23}$ is hydrogen, (1–15C)alkyl, phenyl or phenyl-(1–3C)alkyl, the phenyl in the latter two groups optionally bearing as a substituent, halogeno, (1–4C)alkyl or (1–4C)alkoxy, or with an acyclic (3–16C)ketone or cyclic (4–12C)ketone, under reducing conditions, and optionally followed by reaction with a suitable cross-linking agent.

Particular values for $R^{23}$ include, for example, hydrogen and the corresponding values for $R^{13}$ or $R^{14}$ (except methyl) with one less terminal carbon atom. Thus, when a derivative E is required in which $R^{13}$ or $R^{14}$ is butyl, then an aldehyde of the formula $R^{23}$.CHO in which $R^{21}$ is propyl i.e. butyraldehyde is used. Similarly, when a derivative is required in which $R^{13}$ or $R^{14}$ is an α-branched alkyl, the corresponding ketone is used. It will be understood that when the aldehyde of formula $R^{23}$.CHO is formaldehyde then a derivative E results in which $R^{13}$ and $R^{14}$ are both methyl generally results.

Procedure (a) is an example of a so-called reductive alkylation and reducing conditions generally analogous to those well known in the art for such reactions may be used. The reducing conditions are generally produced by use of a suitable reducing agent such as an alkali borohydride or cyanoborohydride, for example, sodium or potassium borohydride or cyanoborohydride. In general, the reductive alkylation in procedure (a) is performed at a temperature in the range, for example, 5° to 30° C. and, conveniently, at or near ambient temperature. A suitable solvent or diluent such as a (1–4C)alkanol, tetrahydrofuran or t-butyl methyl ether, may conveniently be used for the process (a).

(b) When a derivative B is required in which $R^{13}$ and $R^{14}$ are both methyl is required, the reaction of a linear poly(allylamine) of the formula VII in which n is an integer and of an average molecular weight in the range about 7000 to 85000, with formaldehyde in the presence of formic acid, optionally followed by reaction with a suitable cross-linking agent.

Procedure (b) is an example of the well known Eschweiler-Clarke reductive methylation reaction and conditions similar to those known for analogous methylations may be used, for example, using an excess of formaldehyde (conveniently as an aqueous solution) in formic acid at a temperature in the range, for example 60°–100° C. and conveniently at or near the reflux temperature of the reaction mixture.

The linear poly(allylamines) of formula VII are in general known or may be obtained by procedures well known in the art for analogous compounds. Thus, they are described in European patent application, publication no. 95,233 and are commercially available from Nitto Boseki Company Ltd., of Fukushima-ken, Japan.

It will be understood that in many cases (and especially when a linear (2–6C)alkyl group is being introduced) the reductive alkylation procedure may introduce a proportion of cross-linking structural units of formula Va into the polymeric allylammonium derivative, the proportion introduced depending on factors such as the relative stoichiometry of the reagents of formula VII and the ketone or aldehyde component (which latter may conveniently be used in the form of its hydrate or acetal). This so-called self cross-linking may of its own be sufficient to impart the required swelling capacity to the eventual polymeric allylammonium derivatives D of the invention to make them suitable for the above mentioned pharmaceutical use. However, in other cases, for example when a β-branched alkyl is being introduced using a suitable aldehyde, or when an a-branched alkyl is being introduced using an acyclic or cyclic ketone, then little or no such self cross-linking occurs during the reductive alkylation procedure (a). In such cases, it is necessary to specifically cross-link the initially formed linear poly(N-alkylallylamine) by reacting it with a suitable cross-linking agent, for example of the formula $L^1-X-L^2$ in which X has the meaning defined above and $L^1$ and $L^2$ are suitable leaving groups, such as chloride, bromide, iodide, methanesulphonate, benzenesulphonate or p-toluenesulphonate. Alternatively, for those derivatives where X is (3–14C)polymethylene bearing a hydroxy group on the second carbon atom or (4–14C)polymethylene bearing two hydroxy groups on the second and penultimate carbon atoms, the cross-linking agent may be the appropriate epoxy or diepoxy derivatives of the formula:

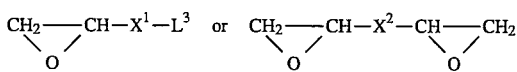

in which $X^1$ is (1–12C)polymethylene, $X^2$ is (1–10C)polymethylene and $L^3$ is a suitable leaving group such as one of those defined above for $L^1$ or $L^2$. Such specific cross-linking reactions may optionally be performed in the presence of a base, for example, an alkali metal hydroxide or carbonate, such as sodium hydroxide or potassium carbonate, and conveniently carried out in the presence of a suitable solvent or diluent such as N, N-dimethylformamide and at a temperature in the range, for example, 10° to 50° C. The above cross-linking reaction conditions may conveniently be modified by including a non-miscible solvent or diluent, for example, toluene, xylene or chlorobenzene, to the reaction mixture so that an emulsion is produced. General conditions for carrying out such modified cross-linking are described, for example in U.S. Pat. No. 4,605,701.

Procedure (a) or (b) may conveniently be modified by first cross-linking a linear poly(allylamine) of the formula VII by reaction with a cross-linking agent such as $L^1-X-L^2$ defined above and then carrying out the reductive alkylation with the aldehyde or ketone component and reducing agent as defined above.

It will be understood that in the above mentioned circumstances when no self cross-linking occurs during the procedure (a) referred to above, then the initially formed, linear (N-alkylated)poly(allylamine) may first be alkylated by reaction with the stoichiometric amount of a suitable alkylating agent as mentioned above, prior to reaction with the cross-linking agent, such as a compound of the formula $L^1-X-L^2$ as defined above. It will also be understood that the precise degree of cross-linking required to produce a polymeric allylammonium derivative of the invention having the required degree of swelling as defined above will also depend on the degree of polymerisation of the linear poly(allylamine) of formula VII.

It will be understood that the above preferred process of the invention may readily be modified, for example, by introducing the cross-linking structural units of empirical formula IIa as a final step after the alkylation procedures. Such a modified process is also provided as a further feature of the invention.

The swelling characteristics of polymeric allylammonium derivatives of the invention may be determined in the following manner:

A sample of the polymeric allylammonium derivative is weighed into a graduated centrifuge tube. Sufficient test solvent [water, ethanol or 0.15M aqueous sodium chloride solution] is then added and the material allowed to swell until no perceptible further swelling occurs (this is typically about 15 to 60 minutes). The test mixture is then centrifuged until sedimentation appears to be complete (about 15 to 30 minutes). The volume of sedimented gel polymeric allylammonium derivative is then measured and the swelling ratio determined (swollen volume (mL) attained per gram sample of polymeric allylammonium derivative). Thus, for example, if a 100 mg sample swells to give a swollen volume of 6 mL, the swelling ratio is 60.

As mentioned above, the polymeric allylammonium derivatives of the invention possess useful effects in reducing elevated levels in blood plasma of low density lipoproteins (LDL) and lipid components thereof such as cholesterol. These effects may be measured by one or more standard tests in laboratory animals.

A first such test is designed to determine the induction of the rate-limiting enzyme for cholesterol synthesis [HMG-CoA reductase] in the livers of hamsters following dietary administration of a test compound. The test has the following basis.

When bile acids are removed from the gastro-intestinal tract, for example, by polymeric materials such as cholestyramine, the liver responds to replace the short-fall by upregulating the synthesis of bile acid from hepatic cholesterol. Hepatic cholesterol is regulated within narrow limits by the induction of specific LDL receptors to acquire LDL-cholesterol from the circulation, and also by the upregulation of cholesterol synthesis via the induction of enzymes, particularly the rate-limiting enzyme HMG-CoA reductase.

The test procedure is as follows:

Hamsters (male Syrian, 100–120 g) are acclimatised individually for one week in a 14 hour light and 10 hour darkness cycle during which they are allowed free access to water and to powdered chow containing 0.75% methionine and 10% hydrogenated coconut oil (saturated fat diet). Animals are weighed daily for three days prior to dosing with test compound, and thereafter throughout the test period. The hamsters are dosed for 7 days by mixing the test compound into the diet at the following levels:

(a) control group—fat diet alone (b) test group—4.56 g test compound/kg diet (corresponds to 456 mg/kg/day for an animal eating 10 g diet/day)

(c) positive control group I: cholestyramine 4.56 g/kg diet (d) positive control group II: cholestyramine 9.12 g/kg diet.

On day 7, a cardiac blood sample is taken (under halothane anaesthesia) from which plasma cholesterol levels are determined using a standard cholesterol assay kit. The animals are sacrificed and a single lobe of liver is excised and placed directly into cold (4° C.) sucrose buffer containing 50 mM sodium fluoride. Hepatic microsomes are prepared according to the method of Ness et al., *Biochem. J.*, 1986, 233, 167–172, snap-frozen and stored in liquid nitrogen prior to assay. Microsomal HMG-CoA reductase activity is then determined according to a modification of the method described by Ness et al., in *Lipids*, 1987, 22, 409–412, for the conversion of $^{14}$C-HMG-CoA to $^{14}$C-mevalonolactone. The reaction product is separated from the substrate by mini-column chromatography, and the recovery of product is monitored by the inclusion of $^3$H-mevalonolactone as an internal standard. From these results the ratio of activity to that of the positive standard, cholestyramine, is then determined.

In general, the polymeric allylammonium derivatives of the invention show a ratio of activity for induction of HMG-CoA reductase of at least 1 (and in many cases of 2 or more) at a daily dose of 456 mg/kg (or less) in the diet, without any overt toxic or other untoward effects. In addition, the polymeric allylammonium derivatives of the invention generally show a significant reduction in plasma cholesterol at a daily dose of 456 mg/kg (or less) in the diet.

As an illustration, the polymeric material of Example 3 shows an activity ratio of about 2.1 for induction of HMG-CoA reductase at a daily dose in the diet of 456 mg/kg.

The property of the polymeric allylammonium derivatives of the invention in reducing elevated blood plasma levels of low density lipoproteins may also be demonstrated in other laboratory models well known in the art, for example, by measuring the increase in excretion of faecal bile acids and related sterols in dogs administered the polymeric allylammonium derivatives alone or as a component of their feed.

It will be understood that for their intended pharmaceutical use, the polymeric allylammonium derivatives of the invention will normally be used in a specially purified form, and then conveniently be administered in the form of a suitable pharmaceutical composition. Therefore, according to another aspect of the invention there is provided a pharmaceutical composition comprising a polymeric allylammonium derivative D1, D2, D3 or D4 as defined above, together with a pharmaceutically acceptable diluent or carrier.

A composition of the invention may be obtained by any of the techniques well known to those skilled in the art of pharmacy and include all those techniques known for the formulation of analogous polymeric materials for human use.

In general, for liquid compositions, aqueous based pharmaceutically acceptable excipients such as water, aqueous ethanol, propylene glycol, polyethylene glycol or glycerol or sorbitol solutions are preferred. Such formulations may conveniently include flavourings, preservatives and sweeteners, such as fruit juices, citric acid, ascorbic acid, aspartame, saccharin, sucrose, fructose, invert sugar and cocoa.

The polymeric allylammonium derivatives of the invention may also be used in a form suitable for direct oral administration. Further, because of their generally low inherent toxicity, they may also be administered orally ad libitum, on a relatively continuous basis, for example, by dispersing the polymer in water, other drinks or food. For example, they may be presented as a granular formulation for admixture with water or other drink to provide a palatable suspension for drinking.

The polymeric allylammonium derivatives of the invention are preferably administered in the form of gelatin capsules or tablets containing the derivative in solid particulate form (alone or together with one or more other particulate excipients such as lactose or micro-crystalline cellulose) or in the form of aqueous or non-aqueous suspensions with a suitable suspending agent. Suitable excipients for such compositions include, for example, for tablets and capsules, lactose, micro-crystalline cellulose, magnesium stearate, polyvinylpyrrolidone, sodium starch glycollate and modified starches; and for suspensions, water, ethanol, polyethylene glycol, propylene glycol and colloidal silicon dioxide. Any of these dosage forms may in addition conveniently contain suitable sweetening, preservative and/or flavouring agents, as mentioned above. The polymeric allylammonium derivatives of the invention may also be conveniently be formulated as a chewable tablet or confectionery bar together with the usual binding, flavouring and sweetening agents.

In general, polymeric allylammonium derivatives of the invention will be administered in unit dosage form, each dosage unit containing preferably from about 0.5 g to 1.5 g of a polymeric allylammonium derivative D1, D2, D3 or D4.

The daily dosage administered for therapeutic or prophylactic purposes to humans will be, for example, a total daily oral dose of between 1 and 10 g, preferably 1–5 g, the compound being administered up to four times per day. However, doses for individual patients will necessarily depend on the age and sex of the patient as well as on the extent and severity of the disease or adverse condition under treatment. In general a polymeric allylammonium derivative of the invention will be administered for a continuous period of one month or more sufficient to achieve the required reduction in plasma lipid levels.

The polymeric allylammonium derivatives of the invention may advantageously be administered together with (or sequentially to) one or more other pharmacological agents known to be useful in the treatment of cardiovascular disease, for example, together with agents such as as HMG-CoA reductase inhibitors, other hypocholesterolaemic agents such as fibrates, for example gemfibrozil, and drugs for the treatment of coronary heart disease.

The invention will now be illustrated by the following non-limiting Examples in which, unless otherwise stated:

(1) all operations were carried out at ambient temperature (that is at a temperature of about 15°–23° C.;

(2) yields are given by way of example only and are not necessarily those which may be obtained by diligent process development;

(3) polymeric allylammonium derivatives of the invention are isolated as the chloride forms and their chloride content is assessed by argentometric analysis;

(4) the term "poly(allylamine)" is used for convenience and is equivalent to the systematic chemical name "poly[1-(aminomethyl)-ethylene]";

(5) abbreviated functional names are accorded to the polymer products obtained by the exemplified procedures to illustrate the main chemical components contained therein; and (6) the percentage quaternisation figures are approximate, maximal figures, having been obtained by subtraction of the demonstrable amine hydrochloride content (measured by potentiometric titration) and are not corrected for any residual non-protonated amine groups which may be present relating to the approximate total content of quaternary ammonium groups.

EXAMPLE 1

[This Example describes the preparation of poly(N, N-dimethylallylamine) hydrochloride required as a starting material.]

Poly(allylamine) hydrochloride, (average molecular weight 50000–83000; 10S category; obtained from Nitto Boseki Company Ltd., of Fukushima-ken, Japan) (46.8 g, 0.5 equivalents) was dissolved in water (100 ml) and the mixture cooled to below 10° C. Sodium hydroxide pellets (20 g, 0.5 mole) were added and the mixture stirred at below 20° C. to form a solution. Formic acid (376 ml, excess) was added followed by 37% w/v formaldehyde aqueous solution (364 ml, excess). The mixture was heated under reflux for 48 hours and then evaporated in vacuo to give a white paste. Water (300 ml) was added and the mixture was evaporated in vacuo. The solid obtained was slurried in methanol (600 ml) and acidified with concentrated hydrochloric acid (100 ml, excess). The liquor was separated by filtration from the precipitated sodium chloride, and evaporated in vacuo to give a soft white solid. This was dissolved in methanol (200 ml) and the solution was drowned out with stirring into acetone (2 L). The poly(N,N-dimethylallylamine) hydrochloride formed was separated by filtration washed with acetone and dried at 50° C. in vacuo to give a white solid (58.7 g); equivalent weight as amine hydrochloride by potentiometric titration with N/10 sodium hydroxide: 163.

EXAMPLE 2

Trimethylene cross-linked poly(N,N-dimethylallylamine), butyl quaternary derivative (48% quaternisation)

Poly(N,N-dimethylallylamine) hydrochloride (15.6 g, 0.1 equivalents) was dissolved in water (75 ml). A solution of sodium hydroxide (4.9 g; 0.12 mole) in water (25 ml) was then added rapidly to the stirred solution of the polyamine hydrochloride at 25°–30° C. The precipitated polyamine free base was collected by filtration and washed with warm water. The resulting solid was dissolved in ethanol (25 ml) and 1,3-dibromopropane (1.05 g, 0.01 equivalents) was added. The mixture was stirred for 2 hours and then left in a warm oven at 45°–50° C. for six days. The resultant gel was slurried in N,N-dimethylformamide (DMF) (300 ml) and finely dispersed with an high shear mixer. 1-Bromobutane (16.4 g, 0.12 equivalents) was then added. The mixture was stirred at 30°–40° C. for six days and then added to ice-water (1 L) and stirred for 10 minutes. Brine (20% w/v, 200 ml) was added. The solid product was removed by filtration, slurried in 0.05N HCl (500 ml), collected by filtration and washed successively with 20% w/v brine, water (twice), ethanol, methanol and then with ether. This material was dried in vacuo at about 50° C. to give the polymer product as a white solid in 58% yield; microanalysis, found: C, 49.7%; H, 11.1%; N, 7.8%; chloride, 22.7%; potentiometric titration showed no free hydrochloric acid (HCl), but 52% as amine hydrochloride, indicating that the polymer product is 48% quaternised; swelling characteristics: water, 90; 0.15M NaCl, 33; and ethanol, 33.

EXAMPLE 3

Hexamethylene cross-linked poly(N,N-dimethylallylamine), methyl quaternary derivative (full quaternisation)

This polymer was prepared from poly(N,N-dimethylallylamine) hydrochloride using a similar procedure to that of Example 2, but replacing the 1,3-dibromopropane cross-linking agent by 1,6-dibromohexane (0.01 equivalents per 0.10 equivalents of polyamine) and the 1-bromobutane by methyl iodide (0.12 equivalents per 0.10 equivalents of polyamine) and using three brine washings to convert iodide to chloride in the end product).

The polymer product was obtained as a white powder (11.9 g); microanalysis, found: C, 43.9%; H, 10.6%; N, 7.7%; chloride, 20.9%; potentiometric titration with 0.1N NaOH showed no free HCl or amine hydrochloride, indicating that the polymer product is essentially fully quaternised; swelling characteristics: water, 22; 0.15M NaCl, 12; and ethanol, 11.

EXAMPLE 4

2-Hydroxytrimethylene cross-linked poly(N,N-dimethylallylamine), benzyl quaternary derivative (89% quaternisation)

This polymer was prepared from poly(N,N-dimethylallylamine) hydrochloride by a similar procedure to that of Example 2 but on twice the scale and using 1,3-dichloropropan-2-ol as cross-linking agent and benzyl bromide as the quaternising agent.

The polymer product was obtained as a white powder (27.5 g); microanalysis, found: C, 61.4%; H, 9.1%; N, 6.3%; chloride, 16.5%; potentiometric titration showed no free HCl, but 11% amine hydrochloride, indicating that the polymer is 89% quaternised; swelling characteristics: water, 78; 0.15M NaCl, 17; and ethanol, 32.

EXAMPLE 5

Trimethylene cross-linked poly(N,N-dimethylallylamine), dodecyl quaternary derivative (50% quaternisation)

This polymer was prepared from poly(N,N-dimethylallylamine) hydrochloride by a similar procedure to that of Example 2, but using 1-iodododecane as the quaternising agent.

The polymer product was obtained as a white powder; (11.6 g); microanalysis, found: C, 53.9%; H, 11.1%; N, 5.9%; chloride, 16.1%; potentiometric titration showed no free HCl, but 50% amine hydrochloride, indicating that the polymer product is 50% quaternised; swelling characteristics: water, 5; 0.15M NaCl, 5; and ethanol, 22.

EXAMPLE 6

Trimethylene cross-linked poly(N,N-dimethylallylamine), octyl quaternary derivative (42% quaternisation)

This polymer was prepared from poly(N,N-dimethylallylamine) hydrochloride by a similar procedure to that of Example 2, but carrying out the quaternisation by heating at reflux for 48 hours in ethanol and using 1-bromooctane (1.2 moles per equivalent of amine) as quaternising agent.

The polymer product was obtained as a white powder (4.2 g); microanalysis, found: C, 47.5%; H, 10.4%; N, 6.9%; chloride, 21.2%; potentiometric titration showed no free HCl, but 58% amine hydrochloride, indicating that the polymer product is 42% quaternised; swelling characteristics: water, 260; 0.15M NaCl, 32; and ethanol, 65.

EXAMPLES 7–18

Using a similar procedure to that described in Example 2 the following polymer products were obtained:

(Example 7)

Trimethylene cross-linked poly(N,N-dimethylallylamine), methyl quaternary derivative (89% quaternisation)

This polymer product was obtained using iodomethane as quaternising agent in the second stage (1 mole per equivalent of amine) which was performed in ethanol (400 ml per 0.1 equivalent amine) over 6 days. The polymer product was obtained in 30% yield; microanalysis, found: C, 42.3%; H, 10.3%; N, 7.8%; chloride, 20.8%; potentiometric titration showed no free HCl, but 11% amine hydrochloride, indicating that the product is 89% quaternised; swelling characteristics: water, 140; 0.15M NaCl, 28; and ethanol, 42.

(Example 8)

Trimethylene cross-linked poly(N,N-dimethylallylamine), butyl quaternary derivative (43% quaternisation)

This polymer product was obtained essentially as described in Example 2, except that the starting poly(N,N-dimethylallylamine) hydochloride was obtained as in Example 1 but using a different sample of poly(allylamine) hydrochloride (average molecular weight about 10000; 3S category, obtained from Nitto Boseki Company Ltd.). The polymer product was obtained in 37% yield; microanalysis, found: C,45.2%; H,10.7%; N,7.9%; chloride, 22.0%; potentiometric titration showed no free HCl, but 57% amine hydrochloride, indicating that the product is 43% quaternised; swelling characteristics: water, 65; 0.15M NaCl, 19; and ethanol, 19.

(Example 9)

Hexamethylene cross-linked poly(N,N-dimethylallylamine), butyl quaternary derivative (38% quaternisation)

This polymer product was obtained by replacing the 1,3-dibromopropane cross-linking agent with 1,6-dibromohexane. The polymer product was obtained in 72% yield; microanalysis, found: C,47.7%; H,11.0%; N,7.7%; chloride, 21.5%; potentiometric titration showed no free HCl, but 62% amine hydrochloride, indicating that the product is 38% quaternised; swelling characteristics: water, 30; 0.15M NaCl, 25; and ethanol, 14.

(Example 10)

Trimethylene cross-linked poly(N,N-dimethylallylamine), butyl quaternary derivative (53% quaternisation)

This polymer product was obtained by replacing 1-bromobutane with 1-iodobutane as quaternising agent. The polymer product was obtained in 59% yield; microanalysis, found: C,49.3%; H,10.5%; N,7.5%; chloride, 20.9%; potentiometric titration showed no free HCl, but 47% amine hydrochloride, indicating that the product is 53% quaternised; swelling characteristics: water, 85; 0.15M NaCl, 30; and ethanol, 25.

(Example 11)

Trimethylene cross-linked poly(N,N-dimethylallylamine), dodecyl quaternary derivative (38% quaternisation)

This polymer product was obtained using poly(N,N-dimethylallylamine) hydrochloride obtained from low molecular weight poly(N,N-dimethylallylamine) obtained as mentioned in Example 8, and replacing 1-bromobutane by 1-bromododecane as quaternising agent. The polymer product was obtained in 57% yield; microanalysis, found: C,53.6%; H,11.5%; N,6.8%; chloride, 18.7%; potentiometric titration showed no free HCl, but 62% amine hydrochloride, indicating that the product is 38% quaternised; swelling characteristics: water 9; 0.15M NaCl, 5; and ethanol, 32.

(Example 12)

Trimethylene cross-linked poly(N,N-dimethylallylamine), dodecyl quaternary derivative (36% quaternisation)

This polymer product was obtained by replacing 1-bromobutane by 1-bromododecane as quaternising agent. The polymer product was obtained in 57% yield; microanalysis, found: C,50.0%; H,10.7%; N,6.8%; chloride, 19.5%; potentiometric titration showed no free HCl, but 64% amine hydrochloride, indicating that the product is 36% quaternised; swelling characteristics: water, 20; 0.15M NaCl, 5; ethanol, 29.

(Example 13)

2-Hydroxytrimethylene cross-linked poly(N,N-dimethylallylamine), octyl quaternary derivative (42% quaternisation)

This polymer product was obtained by using 1,3-dichloropropan-2-ol instead of 1,3-dibromopropane as cross-linking agent, and 1-bromo-octane instead of 1-bromobutane as quaternising agent. The quaternisation stage was carried out at ambient temperature for 4 days followed by 6 days at 40° C. The polymer product was obtained in 35% yield; microanalysis, found: C,43.8%; H,9.9%; N,6.4%; chloride, 18.1%; potentiometric titration showed no free HCl, but 58% amine hydrochloride, indicating that the product is 42% quaternised; swelling characteristics: water, 72; 0.15M NaCl, 14; and ethanol, 18.

(Example 14)

Hexamethylene cross-linked poly(N,N-dimethylallylamine), octyl quaternary derivative (23% quaternisation)

This polymer product was obtained by using 1,6-dibromohexane as cross-linking agent and 1-bromo-octane as quaternising agent. The quaternisation stage was conducted in ethanol (400 ml per 0.1 equivalent of poly(N,N-dimethylallylamine) starting material) at reflux for 48 hours. The polymer product was obtained in 37% yield; microanalysis, found: C,48.6%; H,10.5%; N,7.2%; chloride, 20.4%; potentiometric titration showed no free HCl, but 77% amine hydrochloride, indicating that the product is 23% quaternised; swelling characteristics: water, 120; 0.15M NaCl, 22; and ethanol 37.

(Example 15)

Trimethylene cross-linked poly(N,N-dimethylallylamine), carbamoylmethyl quaternary derivative (87% quaternisation)

This polymer product was obtained by replacing 1-bromobutane with 1-iodoacetamide (0.2 moles per equivalent of poly(N,N-dimethylallylamine) starting material) as quaternising agent. The polymer product was obtained in 65% yield; microanalysis, found: C,43.3%; H,9.1%; N,12.0%; chloride, 18.7%; potentiometric titration showed no free HCl, but 13% amine hydrochloride, indicating that the product is 87% quaternised; swelling characteristics: water, 50; 0.15M NaCl, 17; and ethanol, 4.

(Example 16)

Trimethylene cross-linked poly(N,N-dimethylallylamine), 2-hydroxyethyl quaternary derivative (51% quaternisation)

This polymer product was obtained by replacing 1-bromobutane with 2-iodoethanol (0.2 moles per 0.1 equivalent of poly(N,N-dimethylallylamine) starting material) as quaternising agent. The polymer product was obtained in 58% yield; microanalysis, found: C,45.7%; H,10.5%; N,8.3%; chloride, 21.9%; potentiometric titration showed no free HCl, but 49% amine hydrochloride; indicating that the product is 51% quaternised; swelling characteristics: water, 60; 0.15M NaCl, 24; and ethanol, 10.

(Example 17)

Trimethylene cross-linked poly(N,N-dimethylallylamine), butyl quaternary derivative (20% quaternisation)

This polymer product was obtained by replacing 1-bromobutane with 1-iodobutane (0.02 moles per 0.1 equivalents of poly(N,N-dimethylallylamine) starting material) as quaternising agent in DMF (200 ml per 0.1 equivalents polyamine). The polymer product was obtained in 43% yield; microanalysis, found: C,45.8%; H,12.4%; N,8.6%; chloride, 22.9%; potentiometric titration showed no free HCl, but 80% amine hydrochloride, indicating that the product is 20% quaternised; swelling characteristics: in water, 240; 0.15M NaCl, 48; and ethanol, 80.

(Example 18)

Trimethylene cross-linked poly(N,N-dimethylallylamine), butyl quaternary derivative (37% quaternisation)

This polymer product was obtained by replacing 1-bromobutane with 1-iodobutane (0.04 moles per 0.1 equivalents poly(N,N-dimethylallylamine) starting material) as quaternising agent in DMF (200 moles per 0.1 equivalents polyamine). The polymer product was obtained in 40% yield; microanalysis, found: C,48.1%; H,12.3%; N,8.0%; chloride, 21.0%; potentiometric titration showed no free HCl, but 63% amine hydrochloride, indicating that the product is 37% quaternised; swelling characteristics: water, 240; 0.15M NaCl, 40; and ethanol; 60.

EXAMPLE 19

[This Example describes the production of self cross-linked poly(N-ethylallylamine) hydrochloride which is used as a starting material.]

Poly(allylamine) hydrochloride (category 3S from Nitto Boseki Company Ltd.; 100 g, 1 equivalent) was added to a solution of sodium hydroxide (40 g, 1 mole) in methanol (1 L) and the mixture was stirred at 40°–50° C. for 5 hours and then at ambient temperature for 16 hours. The mixture was reduced in volume by evaporation in vacuo and solid removed by filtration to give a solution (245 g) of poly(allylamine) free base which analysed as 3.2N by potentiometric titration with hydrochloric acid and therefore contained 0.78 equivalents of amine.

A portion of this solution (63 g, 0.2 equivalents) was diluted with ethanol (30 ml) and cooled to below 20° C. Acetaldehyde (8.8 g, 0.2 mole) was added dropwise over 5 minutes, whilst stirring and keeping the mixture below 30° C. During this procedure the mixture gelled, and it was left at 20°–30° C. for a further 15 minutes. The gel was then ground using a mortar and pestle, and mixed with ethanol (50 ml) to form a paste. Sodium borohydride (11.3 g, 0.3 mole) was added to the paste in portions over 20 minutes, with stirring and keeping the reaction temperature below 30° C. The mixture was stirred at ambient temperature for 16 hours and then thoroughly washed with water (about 5 L). The gel was then acidified with hydrochloric acid (1N, about 1 L) and broken up using an high shear mixer. It was then washed acid free with water, shrunk and dehydrated by further washes with ethanol and ether, and then dried in vacuo to give self cross-linked poly(N-ethylallylamine) hydrochloride, as a powder, 21.8. g; microanalysis, found C, 45.9%; H, 10.5%; N, 10.5%; chloride, 25.3%.

EXAMPLE 20

Self cross-linked poly(N-ethylallylamine), dimethyl quaternary derivative (72% quaternisation)

A solution of sodium hydroxide (6.4 g, 0.16 mole) in methanol (26 g) was added to a stirred mixture of self cross-linked poly(N-ethylallylamine) hydrochloride (12.1 g, 0.075 equivalents) in ethanol (200 ml). Iodomethane (42.6 g, 0.3 mole) was then added and the mixture was stirred for 6 days at 30°–40° C. It was then added to ice-water (500 ml). The gelatinous product was collected by filtration, washed thoroughly with water, acidified by washing with hydrochloric acid (1N, 540 ml), again washed thoroughly with water, and then stirred in brine [obtained from NaCl (150 g) in $H_2O$ (500 ml)] for 16 hours to convert iodide to chloride. It was then thoroughly washed successively with water, ethanol and ether and then dried in vacuo to give the title polymer product as a solid, (12.8 g); microanalysis: C, 49.2%; H 11.1%; N, 8.4%; chloride, 21.8%; potentiometric titration showed no free HCl, but 28% amine hydrochloride, indicating that the product is 72% quaternised; swelling characteristics: water, 28; 0.15M NaCl, 11, and ethanol, 10.

EXAMPLE 21

Self cross-linked poly(N-butylallylamine), dimethyl quaternary derivative (67% quaternisation)

A sample of self cross-linked poly(N-butylallylamine) hydrochloride was prepared using an analogous procedure to that in Example 19, but replacing acetaldehyde by butyraldehyde in the reductive alkylation stage. This starting polyamine derivative was then alkylated with iodomethane using a similar procedure to Example 20, with sufficient brine washing in the work-up procedure to remove all iodide ion from the product, which was obtained in 34% yield; microanalysis: C, 49.2%; H, 10.2%; N, 6.5%; chloride, 18.6%; potentiometric titration showed no free HCl, but 33% amine hydrochloride, indicating that the product is 67% quaternised; swelling characteristics: water, 50; 0.15M NaCl, 18; and ethanol, 21.

EXAMPLE 22

Self cross-linked poly(N-octylallylamine) dimethyl quaternary derivative (71% quaternisation)

A sample of self cross-linked poly(N-octylallylamine) hydrochloride was prepared by an analogous procedure to that in Example 19, but replacing acetaldehyde by octanal in the reductive alkylation stage. This polyamine derivative was then alkylated with iodomethane using a similar procedure to Example 20, with sufficient brine washing in the work-up procedure to remove all iodide ion from the product, which was obtained in 45% yield; microanalysis: C, 60.2%; H, 11.7%; N, 5.0%; chloride, 12.6%, potentiometric titration showed no free HCl, but 29% amine hydrochloride, indicating that the product is 71% quaternised; swelling characteristics: water, 2; 0.15M NaCl, 2; and ethanol, 12.

EXAMPLE 23

[This Example describes the preparation of dodecamethylene cross-linked poly(allylamine) required as a starting material.]

A solution of sodium hydroxide (64 g, 1.6 mole) in methanol (200 ml) was added slowly to a stirred solution of poly(allylamine) hydrochloride (category 10S; from Nitto Boseki Company Ltd.; 200 g, 2 equivalents) in water (100 g). The mixture was stirred for a further 30 minutes. 1,12-Dibromododecane (16.4 g, 0.05 mole) and then DMF (60 ml) were added and the mixture stirred for one hour. It was then stirred at 60° C. until it gelled. It was then left standing at this temperature for a total of 24 hours. The gelatinous mixture was basified by dispersal in a solution of sodium hydroxide (17.6 g, 0.44 mole) in water (about 3 L) using an high shear mixer. The gel product obtained was collected by filtration and washed alkali free with water. It was then stirred first with acetone and then with ether, collected by filtration and dried in vacuo to give the dodecamethylene cross-linked poly(allylamine) (147 g); potentiometric titration (involving back-titration of excess acid after soaking an aliquot of the product in hydrochloric acid for several hours) indicated an equivalent weight, as amine, of 98.

EXAMPLE 24

[This Example describes the preparation of dodecamethylene cross-linked poly(N-octylallylamine) hydrochloride required as a starting material.]

Dodecamethylene cross-linked poly(allylamine) (28.5 g, 0.3 equivalents) (prepared as described in Example 23) was dispersed in ethanol (210 ml) and left to swell overnight. Ethanol (390 ml) and octanal (38.5 g, 0.3 mole) were then added, keeping the reaction temperature below 30° C. The mixture was stirred at ambient temperature for 15 minutes. Sodium borohydride (17.0 g, 0.45 mole) was then added slowly, over 20 minutes, keeping the reaction temperature below 30° C. Stirring was continued at this temperature for 2 hours and then for 16 hours at ambient temperature. The mixture was then added to water (1 L). The gelatinous product was collected by filtration, washed thoroughly with water, acidified in aqueous ethanol (50:50 v/v, 1 L) with concentrated hydrochloric acid (60 ml), thoroughly washed with water and then dried by washing with ethanol and ether before being dried in vacuo to give dodecamethylene cross-linked poly(N-octylallylamine) hydrochloride (61.8 g); microanalysis: C, 61.2%; H, 11.9%; N, 6.8%; chloride, 17.4%; swelling characteristics water, 3; 0.15M NaCl,3; and ethanol, 7.

EXAMPLE 25

Dodecamethylene cross-linked poly(N-octylallylamine), dimethyl quaternary derivative (66% quaternisation)

Dodecamethylene cross-linked poly(N-octylallylamine) hydrochloride (22.0 g, 0.1 equivalent) (prepared as described in Example 24) was alkylated with iodomethane using a similar procedure to that in Example 20, with repeated washings with ethanolic hydrochloric acid (about 2N) until the product was iodide free. The polymer product was obtained in 84% yield; microanalysis: C, 62.0%; H, 13.2%; N, 5.4%; chloride, 13.6%; potentiometric titration showed no free HCl, but 34% amine hydrochloride, indicating that the product is 66% quaternised; swelling characteristics: water, 2; 0.15M NaCl, 2; and ethanol, 7.

EXAMPLE 26

Dodecamethylene cross-linked polT(N-dodecylallylamine), dimethyl quaternary derivative (37% quaternisation)

Dodecamethylene cross-linked poly(allylamine), (5 mole % cross-linked: prepared by a similar procedure to that described in Example 23) was converted to the dodecyl derivative by an analogous reductive alkylation to that of Example 24, but using dodecanal as the aldehyde component. The initial product, a poly(N-dodecylallylamine) gel, was methylated by a procedure similar to that of Example 20, using 2.5 mole of iodomethane and 2.0 mole of sodium hydroxide per equivalent of amine. The title polymer product was obtained in 77% yield; microanalysis, found: C,58.4%; H,11.7%; N,4.0%; chloride, 13.4%; potentiometric titration showed no free HCl, but 63% amine hydrochloride, indicating that the product is 37% quaternised; swelling characteristics: water, 4; 0.15M NaCl, 4; and ethanol, 4.

EXAMPLE 27

Trimethylene cross-linked poly(N,N-dimethylallylamine), 2-methylpropyl quaternary derivative (35% quaternisation)

This polymer product was obtained using a similar procedure to that described in Example 2, but 1-iodo-2-methylpropane was used as quaternising agent in the second stage (2 mole per equivalent of amine). The polymer product was obtained in 69% yield; microanalysis, found: C,47.8%; H,10.7%; N,8.9%; chloride, 22.1%; potentiometric titration showed no free HCl, but 65% amine hydrochloride, indicating that the product is 35% quaternised; swelling characteristics: water, 66; 0.15M NaCl, 19; and ethanol, 17.

EXAMPLE 28

Trimethylene cross-linked poly(N-butylallylamine), butyl/methyl quaternary derivative (40% quaternisation)

Trimethylene cross-linked poly(N-butylallylamine) gel was prepared by a similar procedure to Example 24, but replacing 1,12-dibromododecane by 1,3-dibromopropane in the cross-linking stage and octanal by butyraldehyde in the reductive alkylation stage. A portion of this gel (33.0 g, derived from 0.2 equivalents original poly(allylamine) gel) was then slurried in ethanol (350 ml), converted to free base form by addition of methanolic sodium hydroxide (8.6 g, 0.215 mole, in 27 g methanol), and then alkylated by reaction with 1-iodobutane (36.8 g, 0.2 mole) at 40° C. for 2 days. The mixture was then re-basified with methanolic sodium hydroxide [33 g containing NaOH (8.0 g, 0.2 mole)] and alkylated with further 1-iodobutane (55.2 g, 0.3 mole) at 40° C. for 2 days. The gelatinous product was collected by filtration, washed well with ethanol, acidified with hydrochloric acid (1N, about 500 ml), washed thoroughly with water, 20% w/v brine (until iodide free), then with water, ethanol and ether. The material obtained was dried in vacuo to give as the intermediate polymer product poly(N-butylallylamine), butyl alkylated/quaternised, in a yield of 37.4 g; microanalysis, found: C,52.4%; H,10.8%; N,6.6%; chloride, 16.7%; potentiometric titration showed no free HCl, but 86% amine hydrochloride, indicating that the product is 14% quaternised; swelling characteristics: water, 20; 0.15M NaCl, 13; and ethanol, 13.

A half portion of this product (18.7 g, derived from 0.1 equivalents of original poly(allylamine) gel) was stirred in ethanol (1 L) and methanolic sodium hydroxide [16.5 g containing 0.1 mole (4.0 g) NaOH was added]. The mixture was stirred for 10 minutes. The gel was removed by filtration, washed thoroughly with ethanol, and then stirred in ethanol (200 ml) and reacted with iodomethane (21.3 g, 0.15 mole) at 40° C. for 3 days. The mixture was added to water (1 L). The gelatinous solid obtained was collected by filtration and washed thoroughly with water. It was the acidified with hydrochloric acid (1N, 600 ml), and washed thoroughly successively with water, 20% w/v brine (until iodide free), water, ethanol and then ether. It was then dried in vacuo to give the title polymer product (19.0 g) alkylated and quaternised with butyl and methyl; microanalysis, found: C,53.2%; H,10.9%; N,6.2%; chloride, 15.5%; potentiometric titration showed no free HCl, but 60% amine hydrochloride, indicating that the product is 40% quaternised; swelling characteristics: water, 22; 0.15M NaCl, 13; and ethanol, 13.

EXAMPLE 29

Dodecamethylene cross-linked poly(N-butylallylamine), butyl/methyl quaternary derivative (59% quaternisation)

This polymer product was prepared by a similar procedure to that in Example 28, but replacing 1,3-dibromopropane by 1,12-dibromododecane (0.025 mole per equivalent of amine) in the cross-linking stage. The polymer product was obtained in 86% yield; microanalysis, found: C,56.4%; H,11.1%; N,6.5%, chloride, 13.6%; potentiometric titration showed no free HCl, but 41% amine hydrochloride, indicating that the product is 59% quaternised; swelling characteristics: water, 7; 0.15M NaCl, 7; and ethanol,7.

EXAMPLE 30

Trimethylene cross-linked poly(N-dodecylallylamine), dimethyl quaternary derivative (58% quaternisation)

This polymer product was prepared by a similar procedure to that in Example 26, but using only 2.5 mole % (based on amine) of 1,3-dibromopropane as cross-linking agent in the first stage, and 3.0 moles of iodomethane and 2.0 moles of sodium hydroxide per equivalent of poly( N-dodecylallylamine) gel in the methylation stage. The polymer product was obtained in 97% yield; microanalysis, found: C,64.2%; H,12.3%; N,5.5%; chloride, 12.7%, potentiometric titration showed no free HCl, but 42% amine hydrochloride, indicating that the product is 58% quaternised; swelling characteristics: ethanol, 8; [Note: not wetted by water or 0.15M NaCl].

EXAMPLES 31–35

Using a similar procedure to that described in Example 2 the following polymer products were obtained:

(Example 31)

Trimethylene cross-linked poly(N,N-dimethylallylamine), methyl quaternary derivative (100% quaternisation)

This polymer was obtained using iodomethane as quaternising agent in the second stage (1.5 mole per equivalent of amine) which was performed in DMF (250 ml per 0.1 equivalent of amine) over 6 days. The polymer product was obtained in 56% yield; microanalysis, found: C, 45.3%; H, 11.3%; N, 8.3%; chloride 21.8%; potentiometric titration showed no free HCl and no amine hydrochloride, indicating that the product is 100% quaternised; swelling characteristics: water 56; 0.15M NaCl 20; and ethanol, 22.

(Example 32)

Trimethylene cross-linked poly(N,N-dimethylallylamine), methyl quaternary derivative (100% quaternisation)

This polymer product was obtained using 2.5 mole % (based on amine) of 1,3-dibromopropane as cross-linking agent in the first stage, and iodomethane as quaternising agent in the second stage (1.5 mole per equivalent of amine) which was performed in DMF (250 ml per 0.1 equivalent of amine) over 6 days. The polymer product was obtained in 50% yield; microanalysis, found: C, 47.4%; H, 12.2%; N, 8.7%; chloride 22.5%; potentiometric titration showed no free HCl and no amine hydrochloride, indicating that the product is 100% quaternised; swelling characteristics: water, 180; 0.15M NaCl, 32; and ethanol, 48.

(Example 33)

Trimethylene cross-linked poly(N,N-dimethylallylamine), propyl quaternary derivative (61% quaternisation)

This polymer product was obtained using 1-iodopropane as quaternising agent in the second stage (2 mole per equivalent of amine) in DMF (135 ml per 0.1 equivalent of amine). The polymer product was obtained in 61% yield; microanalysis, found: C, 50.1%; H, 10.7%; N, 8.1%; chloride, 21.4%; potentiometric titration showed no free HCl, but 39% amine hydrochloride, indicating that the product is 61% quaternised; swelling characteristics: water, 160; 0.15M NaCl, 28; and ethanol, 44.

(Example 34)

Trimethylene cross-linked poly(N,N-dimethylallylamine), pentyl quaternary derivative (58% quaternisation)

This polymer product was obtained using 1-iodopentane as quaternising agent in the second stage (2 mole per equivalent of amine) in DMF (135 ml per 0.1 equivalent of amine). The polymer product was obtained in 56% yield; microanalysis, found: C, 51.0%; H,10.8%; N, 7.1%; chloride, 19.1%; potentiometric titration showed no free HCl but 42% amine hydrochloride, indicating that the product is 58% quaternised; swelling characteristics: water, 140; 0.15M NaCl 25; and ethanol, 36.

(Example 35)

Trimethylene cross-linked poly(N,N-dimethylallylamine), methyl quaternary derivative (94% quaternisation)

This polymer product was prepared from poly(N, N-dimethylallylamine) hydrochloride using a similar procedure to that of Example 2, but using 0.015 equivalents of the 1,3-dibromopropane cross-linking agent per 0.1 equivalent of polyamine and replacing the 1-bromobutane by iodomethane in the second stage (0.2 mole per 0.1 equivalent of amine). The polymer product was obtained in 62% yield; microanalysis, found: C, 45.0%; H, 10.5%; N, 8.0%; chloride, 20.7%; potentiometric titration showed no free HCl, but 6% amine hydrochloride, indicating that the product is 94% quaternised; swelling characteristics: water, 16; 0.15M NaCl, 8; and ethanol, 8.

EXAMPLE 36

Self cross-linked poly(N-octylallylamine) dimethyl quaternary derivative (66% quaternisation)

A sample of self cross-linked poly(N-octylallylamine) hydrochloride was prepared by an analogous procedure to that in Example 19, but replacing acetaldehyde by octanal in the reductive alkylation stage. This polyamine was then alkylated with iodomethane in DMF (125 ml per equivalent of amine) using a similar procedure to Example 20, but washing with 10% ethanolic hydrochloric acid rather than brine to remove all iodide ion from the product, which was obtained in 65% yield; microanalysis, found: C, 61.3%; H, 11.8%; N, 5.9%; chloride, 13.5%; potentiometric titration showed no free HCl, but 34% amine hydrochloride, indicating that the product is 66% quaternised; swelling characteristics: ethanol, 7; [note: not wetted by water or 0.15M NaCl].

EXAMPLE 37

Trimethylene cross-linked poly(N,N-dimethylallylamine), butyl/methyl quaternary derivative (87% quaternisation)

Partially butylated, trimethylene cross-linked poly(N,N-dimethylallylamine) gel was obtained using a similar procedure to Example 2 with 1-iodobutane (0.05 mole per 0.1 equivalent of polyamine) as quaternising agent in DMF (135 ml per 0.1 equivalent of amine). This gel was converted to the free base form by slurrying in 0.1N sodium hydroxide (1.5 L per 0.1 equivalent of amine) and washing alkali free with ethanol. The gel was then slurried in DMF (135 ml per 0.1 equivalent of amine starting material) and further alkylated by reaction with iodomethane (0.13 mole per 0.1 equivalent of amine starting material) at 40° C. for 2 days. The gelatinous product was collected by filtration and washed thoroughly with water. It was then slurried in ethanolic hydrochloric acid (100 ml 10N hydrochloric acid and 400 ml ethanol per 0.1 equivalent of amine starting material), filtered, and re-treated with the ethanolic hydrochloric acid. It was then thoroughly washed with water, ethanol, acetone and diethyl ether, and dried in vacuo. The polymer was obtained in 54% yield: microanalysis, found: C, 48.5%; H, 12.3%; N, 7.6%; chloride, 22.2% potentiometric titration should no free HCl, but 13% amine hydrochloride, indicating that the product is 87% quaternised; swelling characteristics: water, 100; 0.15M NaCl, 25; and ethanol, 20.

EXAMPLE 38

Trimethylene cross-linked poly(N,N-dimethylallylamine), octyl/methyl quaternary derivative (90% quaternisation)

The polymer was obtained using a similar procedure to that described in Example 37 but 1-iodobutane was replaced by 1-iodooctane as quaternising agent in the first alkylation stage (0.025 mole per 0.1 equivalent of amine starting material). The polymer product was obtained in 44% yield; microanalysis, found: C, 47.6%; H, 10.6%; N, 7.0%; chloride, 19.1%; potentiometric titration showed no free HCl, but 10% amine hydrochloride, indicating that the product is 90% quaternised; swelling characteristics: water, 140; 0.15M NaCl, 25; and ethanol, 45.

EXAMPLE 39

[This example describes the preparation of 2-hydroxypropylene cross-linked poly(allylamine) required as a starting material]

A solution of sodium hydroxide (32 g, 0.8 mole) in water (37 ml) was added slowly to a stirred mixture of poly(allylamine) hydrochloride (category 10S: from Nitto Boseki Company Ltd; 100 g, 1 equivalent) water (300 ml) and ethanol (100 ml). 1,3-Dichloropropan-2-ol (6.5 g, 0.05 mole) was then added and the mixture heated to 55° C. and stirred until it gelled. It was then left standing at this temperature for a total of 6 hours, and for 16 hours further at ambient temperature. The gelatinous mixture was basified by dispersal in a solution of sodium hydroxide (20 g, 0.5 mole) in water (about 2 L) using an high shear mixer. The gel product was collected by filtration and washed alkali free with water. It was then washed with ethanol, collected by filtration and dried in vacuo to give the 2-hydroxypropylene cross-linked poly(allylamine) (72 g); potentiometric titration (involving back titration of excess acid after soaking an aliquot of the product in hydrochloric acid for several hours) indicated an equivalent weight, as amine, of 90.

EXAMPLE 40

2-Hydroxypropylene cross-linked poly(N-cyclohexylallylamine), dimethyl quaternary derivative (46% quaternisation)

2-Hydroxypropylene cross-linked poly(allylamine) (9 g, 0.1 equivalent) (prepared as described in Example 39) was reductively alkylated using a similar procedure to Example 24, but using cyclohexanone as the aldehyde/ketone component. The reaction product, a poly(N-cyclohexylallylamine) gel was collected by filtration, washed thoroughly with water and then ethanol, then slurried in a solution of sodium hydroxide (6.0 g, 0.15 mole) in ethanol (400 ml) and water (200 ml). The free base gel was collected by filtration and washed alkali free with water, then thoroughly washed with ethanol. It was sucked dry and then slurried in DMF (200 ml). Iodomethane (56.8 g, 0.4 mole) was added and the mixture stirred at 45° C. for 6 days. The gel product obtained was collected and washed thoroughly with ethanol. It was then converted to the chloride form by repeated slurrying in a solution of hydrochloric acid (about 100 ml cHCl) in ethanol (500 ml) and water (200 ml) until the washings were iodide-free. It was then washed with water until acid-free, washed thoroughly with ethanol, and dried in vacuo to give the polymer product (19.0 g), microanalysis, found: C, 50.0%; H, 10.1%; N, 6.6%; chloride, 15.4%; potentiometric titration showed no free HCl, but 54% amine hydrochloride, indicating that the product is 46% quaternised; swelling characteristics: water, 19; 0.15M NaCl, 12; and ethanol, 11.

EXAMPLE 41

2-Hydroxypropylene cross-linked poly(N-3-methylbutylallylamine), dimethyl derivative (57% quaternisation)

This polymer product was prepared by a similar procedure to that of Example 40 but replacing cyclohexanone by 3-methylbutanal in the reductive alkylation stage. The polymer product was obtained in 79% yield; microanalysis, found: C, 55.8%; H, 8.4%; N, 6.6%; chloride, 14.6%; potentiometric titration showed no free HCl, but 43% amine hydrochloride, indicating that the product is 57% quaternised; swelling characteristics: water, 21; 0.15M NaCl, 12; and ethanol, 11.

EXAMPLE 42

Trimethylene cross-linked poly(N,N-dimethylallylamine), hexyl quaternary derivative (57% quaternisation)

This polymer product was obtained by an analogous procedure to that described in Example 2, using 1-iodohexane as quaternising agent in the second stage (2 mole per equivalent of amine) in DMF (135 mL per 0.1 equivalent of amine). The polymer product was obtained in 57% yield; microanalysis, found: C, 53.2%; H, 11.0%; N, 6.7%; chloride, 19.3%; potentiometric titration showed no free HCl, but 43% of amine hydrochloride, indicating that the product is 57% quaternised; swelling characteristics: water, 132; 0.15M NaCl, 28; and ethanol, 34.

EXAMPLE 43

[This example describes the preparation of trimethylene cross-linked poly(allylamine) required as a starting material.]

A solution of sodium hydroxide (64 g, 1.6 mole) in methanol (200 g) was added slowly to a solution of poly(allylamine) hydrochloride (category 10S; from Nitto Boseki Company Ltd; 200 g, 2 equivalents) in water (100 g), followed by ethanol (60 mL). The mixture was stirred for one hour until homogeneous. 1,3-dibromopropane (10.1 g, 0.05 mole) was then added and the mixture heated to 60° C. and stirred until it gelled. It was left standing at this temperature for 1 day then worked-up by a similar procedure to that of Example 39. The title product was obtained as a white powder (159.3 g); potentiometric titration (involving back-titration of excess acid after soaking an aliquot of the product in hydrochloric acid for several hours) indicated an amine equivalent weight of 95.

EXAMPLE 44

[This example describes the preparation of trimethylene cross-linked poly(N-ethylallylamine) hydrochloride required as a starting material.]

Trimethylene cross-linked poly(allylamine), prepared as described in Example 43 was reductively alkylated by a similar procedure to that described in Example 24 but using acetaldehyde as aldehyde component and with a reduced charge of ethanol (a total of 280 mL per 0.3 equivalent of amine starting material). The polymer product was obtained in 98% yield, microanalysis, found: C, 50.2%; H, 11.8%; N, 9.3%; chloride, 21.7% potentiometric titration showed no free HCl, and an equivalent weight, as amine hydrochloride, of 149; swelling characteristics: water, 27; 0.15M NaCl, 16; and ethanol, 11.

EXAMPLE 45

Trimethylene cross-linked poly(N-methyl-N-ethylallylamine), ethyl quaternary derivative (23% quaternisation)

Trimethylene cross-linked poly(N-ethylallylamine) hydrochloride, prepared as described in Example 44 (32.8 g, 0.22 equivalents) was suspended in water (500 mL). A solution of sodium hydroxide (8.8 g, 0.22 mole) in water (11 mL) was then rapidly added to the stirred suspension of the polyamine and stirring was continued for 30 minutes. The polyamine free base was collected by filtration and washed alkali-free with water. The resulting solid was added with stirring to formic acid (400 mL, excess), followed by 37% formaldehyde aqueous solution (400 mL, excess). The mixture was heated under reflux for 30 hours then cooled and the solid collected by filtration. It was washed with 10% w/v brine then slurried in a solution of sodium hydroxide (10 g, 0.25 mole) in water (500 mL). The solid was collected by filtration and washed with ethanol (about 1 L), 0.5N NaOH (500 mL) then alternately with ethanol and with water (about 500 mL) until alkali free, ending with an ethanol wash. The solid was sucked dry then dispersed into DMF (300 mL). Iodoethane (62.4 g, 0.4 mole) was added to the stirred suspension of polyamine, which was then stirred at 45° C. for 2 days, then cooled and filtered. The solid was collected by filtration and then slurried with concentrated hydrochloric acid (200 mL) in water (400 mL), then filtered and washed with acetone (500 mL) water (1 L) and ethanol (1 L). This acidification and washing was repeated until the washings were iodide free. The solid was then washed alternately with water and ethanol (1 L portions) until the washings were acid-free, then dried in vacuo to give the polymer product as a white solid (32 g), microanalysis, found: C, 46.4%; H, 10.2%; N, 7.0%; chloride, 16.8%; potentiometric titration showed no free HCl, but 77% amine hydrochloride, indicating that the product is 23% quaternised; swelling characteristics: water, 23; 0.15M NaCl, 11 and ethanol, 14.

EXAMPLE 46

Dodecamethylene cross-linked poly(N-octyl-N-butylallylamine), methyl quaternary derivative (38% quaternisation)

Dodecamethylene cross-linked poly(N-octylallylamine) hydrochloride (22.7 g, 0.1 equivalents) (prepared as described in Example 24) was alkylated with 1-iodobutane using a similar procedure to that in Example 20 but isolated by filtration and washing of the collected solid with ethanol. This solid was then slurried in a solution of sodium hydroxide (4.0 g, 0.1 mole) in ethanol (about 1 L) and washed thoroughly with ethanol. The solid was sucked dry and suspended in DMF (150 mL). Iodomethane (14.3 g, 0.1 mole) was added to the suspension of polyamine, which was then stirred at 45° C. for 2 days. The solid was collected by filtration and slurried in a solution of concentrated hydrochloric acid (200 mL) in water (800 mL) then washed with ethanol (1 L). This acidification and washing was repeated until the washings were iodide-free. The solid was then washed with ethanol until acid-free, then with diethyl ether and finally dried in vacuo. The title polymer product was obtained as a white solid (25 g); potentiometric titration showed no free HCl, but 62% of amine hydrochloride, indicating that the product is 38% quaternised; swelling characteristics: water, 4; 0.15M NaCl, 4; and ethanol, 5.

EXAMPLE 47

[This Example describes the preparation of trimethylene cross-linked poly(N,N-dimethylallylamine) hydrochloride required as a starting material.]

Trimethylene cross-linked poly(allylamine) was prepared by a similar procedure to that described in Example 43 but using 0.05 mole of 1,3-dibromopropane per equivalent of poly(allylamine) starting material and replacing the ethanol (60 mL) diluent by methanol (200 mL). The product was isolated as the hydrochloride by a similar procedure to that of Example 24. Potentiometric titration indicated that the equivalent weight of the product, as amine hydrochloride, was 156.

A portion of this product (78.0 g, 0.5 equivalent) was swollen in a solution of sodium hydroxide (20 g, 0.5 mole) in water (about 400 mL). Formic acid (376 mL, excess) was slowly added to the stirred suspension of polyamine, followed by 40% w/v formaldehyde aqueous solution (364 mL, excess). The mixture was then refluxed, with stirring, for 2 days. The solid was collected by filtration, washed thoroughly with water, then acidified with 2N hydrochloric acid (2.4 L, excess). The solid was then washed acid free with water, then shrunk by washing successively in ethanol, acetone and ether and dried in vacuo to give the title polymer product as a white powder (70.5 g). Microanalysis, found: C, 41.0%; H, 9.4%; N, 8.8%; chloride, 25.7%; potentiometric titration showed no free HCl and indicated that the equivalent weight of the product, as amine hydrochloride, was 144.

EXAMPLE 48

Trimethylene cross-linked poly(N,N-dimethylallylamine), octyl/methyl quaternary derivative (89% quaternisation)

Trimethylene cross-linked poly(N, N-dimethylallylamine) hydrochloride (28.0 g, 0.2 equivalent) (prepared as described in Example 47) was converted to the free base form by slurrying into a solution of sodium hydroxide (10 g, 0.25 mole) in ethanol (300 mL) and water (120 mL). The solid was collected by filtration and washed acid-free with water, then shrunk by washing in ethanol, acetone and DMF. It was sucked semi-dry and slurried in DMF (200 mL). 1-Iodooctane (14.4 g, 0.06 mole) was added to the suspension which was stirred at 40° C. for 6 days. The solid was then collected by filtration, washed with water (1 L) and ethanol (1 L), then slurried in a solution of sodium hydroxide (14 g, 0.35 mole) in ethanol (1 L). The solid was then washed successively with water, ethanol, acetone and ether and sucked dry. It was then slurried in DMF (300 mL) and iodomethane (56.3 g, 0.4 mole) was added. The suspension was stirred at 40° C. for 2 days, then drowned out into water (about 2 L). The solid was collected by filtration and washed free of iodide by repeated treatments with concentrated hydrochloric acid (100 mL) in ethanol (400 mL), (each followed by a wash with acetone). The solid was washed acid-free with water, then shrunk by washing successively in ethanol, acetone and diethyl ether, and dried in vacuo to give the title polymer product as a white solid (26 g); microanalysis, found: C, 48.9%; H, 10.4%; N, 7.6%; chloride, 19.8%; potentiometric titration showed no free HCl, but 11% amine hydrochloride, indicating that the product is 89% quaternised; swelling characteristics: water, 20; 0.15M NaCl, 12; and ethanol, 10.

EXAMPLE 49

Trimethylene cross-linked poly(N,N-dimethylallylamine)butyl quaternary derivative (64% quaternisation).

Trimethylene cross-linked poly(N,N-dimethylallylamine)hydrochloride (35.0 g, 0.25 equivalent), prepared as described in Example 47, was converted to the free base form by slurrying with a solution of sodium hydroxide (12 g, 0.3 mole) in ethanol (400 mL) and methanol (50 mL). The solid was collected by filtration and washed acid free with water, then shrunk by washing in ethanol and DMF. It was sucked semi-dry and slurried in DMF (300 mL). 1-Iodobutane (55.2 g, 0.3 mole) was added to the suspension which was stirred at 40° C. for 6 days and then added to water (1 L). The solid obtained was collected by filtration and slurried in a mixture of concentrated hydrochloric acid (100 mL) and ethanol (500 mL). The solid was filtered off and re-treated with ethanolic hydrochloric acid. It was then thoroughly washed with acetone and water, shrunk by washing with ethanol, acetone and ether, and then dried in vacuo.

The polymer product was obtained as a white powder (34.7 g); microanalysis, found: C,50.4%; H,11.0%; N,7.3%; chloride 20.8%; potentiometric titration with 0.1N NaOH showed 14% of the chloride present as free HCl and 31% as amine hydrochloride, indicating that the polymer product (i.e. ignoring free HCl) is 64% quaternised; swelling characteristics: water, 22; 0.15M NaCl, 13; and ethanol, 12.

EXAMPLE 50

Self cross-linked poly(N-octylallylamine), dimethyl quaternary derivative (48% quaternisation).

This polymer was prepared from self cross-linked poly(N-octylallylamine) hydrochloride using an analogous procedure to that described in Example 36 but using less iodomethane (3 mole per 1 equivalent of polyamine) as quaternising agent.

The polymer product was obtained in 62% yield; microanalysis, found: C,60.3%; N,11.4%; N,4.9%; chloride 15.4%; potentiometric titration showed no free HCl, but 52% amine hydrochloride, indicating the product is 48% quaternised; swelling characteristics: water or 0.15M NaCl: not wetted; ethanol, 8.

EXAMPLE 51

[This Example describes the conversion of the product of Example 2 to the citrate salt.]

The product of Example 2 (3.5 g, 0.02 equivalents as the chloride salt) was suspended in water (350 mL). A solution of trisodium citrate (59.0 g, 0.2 mole) in water (150 mL) was then added and the mixture was stirred overnight. The solid was collected by filtration and re-treated with the same amount of trisodium citrate solution. The resultant solid was again collected by filtration, thoroughly washed with water (until the washings were chloride free), then shrunk by washing successively with ethanol, acetone and then ether, and finally dried in vacuo to give trimethylene cross-linked poly(N,N-dimethylallylamine), butyl quaternary derivative as the citrate salt, obtained as a white powder (3.0 g); microanalysis, found: C,56.4%; H,10.2%; N,7.5%; chloride—not detectable.

EXAMPLE 52

Trimethylene cross-linked poly(N,N-dimethylallylamine), octyl/methyl quaternary derivative (91% quaternisation)

A solution of sodium hydroxide (12.8 g, 0.32 mole) in water (4 mL) and methanol (88 mL) was added slowly to a solution of poly(allylamine) hydrochloride (category 10S; from Nitto Boseki Company Ltd; 40 g, 0.4 equivalents) in water (20 mL) and methanol (24 mL). The mixture was stirred for 2 hours until homogeneous. 1,3-Dibromopropane (4.14 g, 0.02 mole) was then added and the reaction heated to 60° C. and stirred until it gelled (10 minutes). The mixture was allowed to stand at 60° C. for 65 hours, then worked up by a similar procedure to that described in Example 39. Trimethylene cross-linked poly(allylamine) was isolated as a colourless wet gel (816 g, A). [A sample (20 g) was converted to trimethylene cross-linked poly(allylamine) hydrochloride by a procedure similar to that described in Example 24 to give material of microanalysis, found: C, 32.3%; H, 9.2%; N, 11.6%; chloride, 27.4%.

A portion of gel A (306 g) was methylated directly by a procedure similar to that described in Example 47, except that it was first slurried in water and dried by filtration. This process was repeated and the gel then shrunk using saturated sodium chloride solution. Liquid was removed by filtration and the residue was suspended in water (60 mL) stirred, and a solution of sodium hydroxide (6 mL, 10M) was added to adjust the pH to 11. After the methylation with formic acid/formaldehyde, intermediate trimethylene cross-linked poly(N,N-dimethylallylamine) was washed with water until acid free, and collected by filtration as a colourless wet gel, B (342 g).

The bulk of B (331 g, ca 0.139 equivalents) was slurried in water (300 mL) and treated with sodium hydroxide solution (10N, 14.0 mL) for 30 minutes at room temperature. The solid was collected by filtration, washed with water (4 L), then shrunk by washing in ethanol (3×300 mL) and DMF (3×150 mL). It was dried by filtration to give a white solid which was slurried in DMF (141 mL). 1-Bromooctane (9.4 g, 0.049 mole) was then added to the suspension which was stirred at 45° C. for 7 days.

A portion of the cooled DMF suspension (150 mL, approximately 0.134 equivalents) was transferred to 4 Carius tubes, diluted with DMF (150 mL in total), and chilled. Excess triethylamine (1.46 g, 10 mole %) and excess, chilled bromomethane (138 g, 1.46 mole) were added to the suspension. The Carius tubes were sealed using polytetrafluoroethylene seals, and maintained at 45° C. under pressure for 7 days. The reaction mixture was then cooled and the solid filtered off. The solid was washed successively with water (2×500 mL), dilute hydrochloric acid (2N, 3×400 mL) and water (5×500 mL). The solid was finally suspended in water (1.5 L) and freeze-dried to give the title polymer (18.2 g) as a white solid. Microanalysis, (after 2 hours equilibration of sample, open to atmosphere) found: C, 47.5%; H, 11.1%; N, 7.5%; chloride, 16.1%; bromide, 1.7%; $H_2O$ 17.5%; potentiometric titration showed no free HCl but 9.0% amine hydrochloride, indicating that the product is 91% quaternised; swelling characteristics: water, 30; 0.15M NaCl, 13; and ethanol, 13.

EXAMPLE 53

[This Example describes the preparation of a trimethylene cross-linked poly(N,N-dimethylallylamine) hydrochloride required as a starting material.]

Trimethylene cross-linked poly(allylamine) was prepared by a similar procedure to that described in Example 43 but using 0.05 mole of 1,3-dibromopropane per equivalent of poly(allylamine) hydrochloride, (category L, molecular weight range 8500–11000, available from Nitto Boseki Company Ltd., of Fukushima-ken, Japan; 10 g, 0.1 equivalents) as starting material and replacing the ethanol diluent by methanol (6 mL).

The product was isolated as the hydrochloride by a similar procedure to that in Example 24. Potentiometric titration indicated that the equivalent weight of the product, as amine hydrochloride, was 129.

A portion of this product (9.72 g, 0.075 equivalent) was swollen in a solution of sodium hydroxide (3.52 g, 0.088 mole) in water (about 93 mL). Formic acid (66 mL, excess) was slowly added to the stirred suspension of polyamine, followed by 40% w/v formaldehyde aqueous solution (64 mL, excess). The mixture was then refluxed, with stirring, for 1 day. The solid was collected by filtration and washed thoroughly with water. A sample (3.5 g wet solid, ca 2%) was then acidified with a mixture of concentrated hydrochloric acid (2 mL) and water (30 mL). The solid obtained was washed acid free with water, shrunk by washing successively in ethanol and ether and dried in vacuo to give the title polymer product as a white powder (0.148 g). Microanalysis, found: C, 57.4%; H, 11.6%; N, 12.1%; chloride, 17.8%.

EXAMPLE 54

Trimethylene cross-linked polT(N,N-dimethylallylamine), octyl/methyl quaternary derivative (93 % quaternisation)

Trimethylene cross-linked poly(N,N-dimethylallylamine) hydrochloride, wet solid (168.8 g, ca 0.073 equivalent) (prepared as described in Example 53) was converted to the free base form by slurrying in a solution of sodium hydroxide (10M, 8.6 mL) in water (173 mL). The solid was collected by filtration and washed acid-free with water, then shrunk by washing in DMF.

It was sucked semi-dry and slurried in DMF (87 mL). 1-Iodooctane (6.2 g, 0.026 mole) was added to the suspension which was stirred at 45° C. for 1 day, cooled, and poured into water (180 mL). The solid was then collected by filtration, washed with thoroughly with water and ethanol, then slurried in water (180 mL) and treated with sufficient sodium hydroxide solution (10M, ca 1 mL) to raise the pH to 11. The solid was then washed successively with water, then DMF, and sucked dry. It was then slurried in DMF (75 mL) and iodomethane (24.6 g, 0.173 mole) was added. The suspension was stirred at 45° C. for 2 days, then drowned out into water (about 0.5 L). The solid was collected by filtration and washed free of iodide by repeated treatments with concentrated hydrochloric acid (38 mL) in ethanol (250 mL), (each followed by a wash with acetone). The solid was washed acid-free with water, then shrunk by washing successively in acetone and diethyl ether, and dried in vacuo to give the title polymer product as a white solid (12 g); microanalysis, found: C, 3.2%; H, 11.0%; N, 8.1%; chloride, 18.8%; potentiometric titration showed no free HCl but 7% amine hydrochloride, indicating that the product is 93% quaternised; swelling characteristics; water, 14; 0.15M NaCl, 7; and ethanol 9.

EXAMPLE 55

Trimethylene cross-linked, poly(N,N-dimethylallylamine) octyl/methyl quaternary derivative (90% quaternisation)

A sample of trimethylene cross-linked, poly(allylamine) was prepared by a similar procedure to that described in Example 52 but using poly(allylamine) hydrochloride (category 3S; average molecular weight range 7500–11000, available from Nitto Boseki Company Ltd., of Fukushima-ken, Japan; 10 g; 0.1 equivalents) as starting material. The solid obtained was isolated, washed and dried in the same way to give a trimethylene cross-linked, poly(allylamine) hydrochloride as a white powder, (9.93 g) microanalysis, found: C, 39.0%; H, 9.2%; N, 12.3%; chloride, 30.1% bromide 2.8%; equivalent weight based on total halide ion=113.

Methylation, using formic acid and formaldehyde under reflux for 26 hours was carried out essentially as described in Example 52, to give trimethylene cross-linked poly(N, N-dimethylallylamine) hydrochloride (171 g) as a wet colourless gel. This material (168 g, ca 0.08 equivalents), was basified (sodium hydroxide) and treated with 1-iodooctane (5.9 g, 0.024 mole) and then with iodomethane (23.5, 0.17 mole), as described in Example 54, to give the title polymer as a white solid (12. g); microanalysis, Found: C, 48.0%; H, 11.1%; N, 7.5%; Cl, 17.6%; Br, nil; potentiometric titration showed no free HCl but 10% amine hydrochloride, showing that the product is 90% quaternised; swelling characteristics; water, 17; 0.15M NaCl 5; and ethanol, 9.

EXAMPLE 56

Trimethylene cross-linked, poly(N,N-dimethylallylamine), octyl/methyl quaternary derivative (88% quaternisation)

A sample of trimethylene cross-linked, poly(allylamine) hydrochloride was prepared by a similar procedure to that described in Example 53 but using category H poly(allylamine) hydrochloride (average molecular weight range: 50,000–65,000, available from Nitto Boseki Company Ltd., of Fukushima-ken, Japan; 10 g, 0.1 equivalents) as starting material. The solid material obtained was isolated, washed and dried in the same way as in Example 53 to give the polymer product as a white powder (10.7 g); microanalysis, found: C, 39.5%; H, 9.5%; N, 12.8%; chloride, 31.8%; bromide, 2.5%; analytical equivalent weight=107.9, based on total halide.

Methylation under reflux for 24 hours using a similar procedure to that described in Example 53 gave the intermediate C as a wet gel (170 g). A small sample of C (3.5 g) was converted to hydrochloride as described in Example 53 to give trimethylene cross-linked, poly(N, N-dimethylallyamine) hydrochloride as a white powder (0.17 g); microanalysis, found: C, 52.6%; H, 11.5%; N, 11.0%; chloride, 17.2%; analytical equivalent weight=206.

The bulk sample of the intermediate C (167 g as a wet solid, ca 0.093 equivalents) was basified (sodium hydroxide)

and treated with 1-iodooctane (6.7 g 0.027 mole), then with iodomethane (26.5 g, 0.19 mole), as described in Example 54, to give the title polymer as a white solid (12.5 g); microanalysis, found: C, 47.7%; H, 11.1%; N, 7.4%; Cl, 17.8%; Br, nil: potentiometric titration showed no free HCl but 12% amine hydrochloride, indicating that the product is 88% quaternised; swelling characteristics; water, 16; 0.15M NaCl, 7; and ethanol, 13.

EXAMPLE 57

[This Example describes the preparation of a trimethylene cross-linked poly(allylamine) hydrochloride required as a starting material.]

Trimethylene cross-linked poly(allylamine) was prepared by a similar procedure to that described in Example 43 but using 0.05 mole of 1,3-dibromopropane per equivalent of poly(allylamine) starting material and replacing the ethanol (60 mL) diluent by methanol (230 mL). The gelatinous mixture was dispersed in water using an high shear mixer, collected by filtration and then slurried in an excess of dilute aqueous hydrochloric acid. It was first washed acid-free with water, then with ethanol and dried in vacuo. The polymer product was obtained in 85% yield; microanalysis, found: C, 39.0%; H, 9.5%; N, 12.8%; chloride 33.1%. Potentiometric titration showed no free HCl, and an equivalent weight, as amine hydrochloride, of 110; swelling characteristics: water, 24; 0.15M NaCl, 18; and ethanol, 2.

EXAMPLE 58

Trimethylene cross-linked poly(N,N-dimethylallylamine) octyl/methyl quaternary derivative (91% quaternisation)

Trimethylene cross-linked poly(allylamine) hydrochloride prepared as described in Example 57 (55.0 g, 0.50 equivalents) was swollen in a solution of sodium hydroxide (20 g, 0.5 mole) in water (about 500 mL). Formic acid (376 mL excess) was added slowly to the stirred suspension of polyamine, followed by aqueous formaldehyde solution (40% w/v, 364 mL; excess). The mixture was then heated under reflux with stirring for 24 hours. The solid product was collected by filtration and thoroughly washed with water. It was then suspended in a solution of sodium hydroxide (20 g, 0.5 mole) in water (about 1 L). The solid was collected by filtration, washed thoroughly with water to remove excess alkali, then washed with ethanol (200 mL) and twice with DMF (500 mL each), to give the intermediate poly(N,N-dimethylallylamine) gel as a semi-dry paste.

This paste was slurried in DMF (500 mL) and 1-iodooctane (36.0 g, 0.15 mole) was added to the suspension which was stirred at 45° C. for 24 hours. The solid was collected by filtration, washed with water (2 L) and twice with ethanol (1 L each) and sucked dry. It was then slurried in a solution of sodium hydroxide (4.5 g, 0.11 mole) in water (about 1 L) to ensure complete conversion of amine to the free base form. The solid obtained was collected by filtration and washed alkali-free with water, then shrunk by washing three times with DMF (500 mL each) and sucked semi-dry. The residue slurried in DMF (500 mL) and iodomethane (142 g, 1.0 mole) was added. The suspension was stirred at 45° C. for 24 hours, then poured into water (about 2 L). The solid obtained was collected by filtration and washed free of iodide by repeated treatments with a mixture of concentrated hydrochloric acid (50 mL) in ethanol (1 L) and water (500 mL), (each followed by a wash with acetone). The solid was then washed with water, shrunk by washing with acetone and diethyl ether, and dried in vacuo to give the title polymer product as a white solid (66.5 g); microanalysis, found: C, 53.9%; H, 11.0%; N, 7.8%; chloride, 19.1%; potentiometric titration showed no HCl, but 9% amine hydrochloride, indicating that the product is 91% quaternised; swelling characteristics: water, 16; 0.15M NaCl, 9; and ethanol, 9.

EXAMPLE 59

Representative compositions of a polymeric allylammonium derivative of the invention, for example such as is described in one of the previous Examples, suitable for administration to man for therapeutic or prophylactic purposes, may be obtained as follows:

(a) Capsule

Finely pulverised polymeric allylammonium derivative 320 mg

Microcrystalline cellulose 80 mg

The finely powdered materials are packed in a conventional manner into hard gelatine capsules.

(b) Chewable Tablet

| | |
|---|---:|
| Finely pulverised polymeric allylammonium derivative | 600 mg |
| Microcrystalline cellulose | 120 mg |
| Silica | 10 mg |
| Sorbitol | 220 mg |
| Lactose | 220 mg |
| Magnesium stearate | 12 mg |
| Flavourings | 5 mg |

(c) Liquid Suspension

| | |
|---|---:|
| Finely pulverised polymeric allylammonium derivative | 1000 mg |
| Sorbitol* | 200 mg |
| Potassium citrate | 20 mg |
| Benzyl alkonium chloride* | 5 mg |
| Flavourings | 5 mg |
| Deionised water to 10 mL | |

*Note: an alternative conventional suspending agent or preservative may be substituted.

| | EMPIRICAL STRUCTURAL FORMULAE |
|---|---|
| 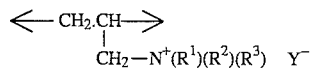 | I |
| 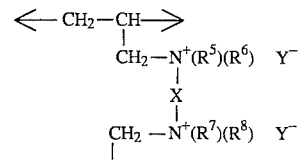 | IIa |
| 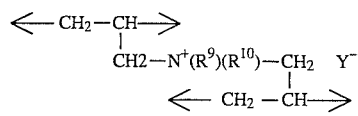 | IIb |
| 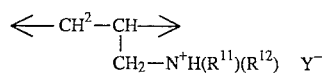 | III |
| 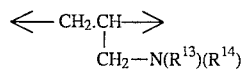 | IV |

| EMPIRICAL STRUCTURAL FORMULAE | |
|---|---|
| 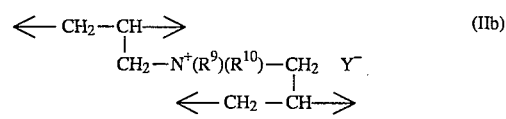 | Va |
| 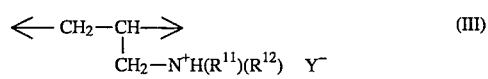 | Vb |
| 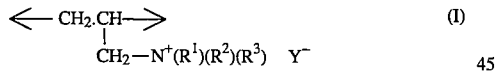 | Vc |
| 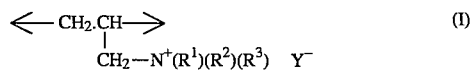 | VI |
| 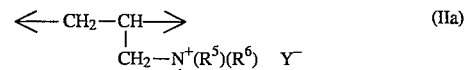 | VII |

Note: ⟵ and ⟶ show points of attachment to adjacent structural units

What is claimed is:

1. A pharmaceutical composition which comprises: an insoluble swellable polymeric allylammonium derivative D1 comprising in random order:

(i) at least 10 mole percent of quaternary propylammonium structural units of formula I:

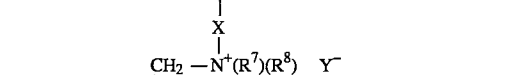

wherein one of $R^1$, $R^2$ and $R^3$ is (1–16C)alkyl, (4–12C)cycloalkyl or phenyl-(1–4C)alkyl, the latter phenyl moiety optionally bearing one or two substituents independently selected from halogeno, (1–4C)alkyl and (1–4C)alkoxy; another of $R^1$, $R^2$ and $R^3$ is (1–4C)alkyl; and the other of $R^1$, $R^2$ and $R^3$ is (1–4C)alkyl optionally bearing a carbamoyl substituent, or is (2–4C)alkyl bearing a hydroxy substituent on other than an α-carbon atom; and Y is a physiologically acceptable anion;

(ii) about 0.5 to 10 mole percent of cross-linking structural units of formula IIa and/or IIb:

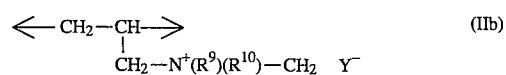

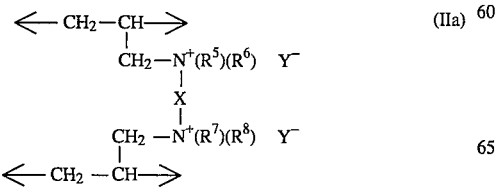

wherein $R^5$, $R^6$, $R^7$ and $R^8$ are independently hydrogen or one of the values of $R^1$, $R^2$ and $R^3$ defined above; one of $R^9$ and $R^{10}$ is hydrogen or (1—4C) alkyl; the other of $R^9$ and $R^{10}$ has one of the values of $R^1$, $R^2$ and $R^3$ defined above; Y has the meaning defined above; and X is a cross-linking group; and (iii) the remainder of structural propylamine units of formula III:

$$\xleftarrow{} CH_2-CH \xrightarrow{} \quad (III)$$
$$\quad | \quad$$
$$CH_2-N^+H(R^{11})(R^{12}) \quad Y^-$$

wherein $R^{11}$ and $R^{12}$ are independently hydrogen or one of the values of $R^1$, $R^2$ and $R^3$ defined above; and Y has the meaning defined above; said derivative D1 having the property of swelling by between about 2 and 200 times in volume in at least one of water, 0.15M aqueous sodium chloride solution, and ethanol; together with a pharmaceutically acceptable diluent or carrier.

2. A method of lowering elevated levels of lipoid components in plasma of a warm-blooded animal requiring such treatment which comprises administering to said animal a lipoid component lowering effective amount of an insoluble, swellable polymeric allylammonium derivative D1 comprising in random order:

(i) at least 10 mole percent of quaternary propylammonium structural units of formula I:

$$\xleftarrow{} CH_2.CH \xrightarrow{} \quad (I)$$
$$\quad | \quad$$
$$CH_2-N^+(R^1)(R^2)(R^3) \quad Y^-$$

wherein one of $R^1$, $R^2$ and $R^3$ is (1–6C)alkyl, (4–12C)cycloalkyl or phenyl(1–4C)alkyl, the later phenyl moiety optionally bearing one or two substituents independently selected from halogeno, (1–4C)alkyl and (1–4C)alkoxy; another of $R^1$, $R^2$ and $R^3$ is (1–4C)alkyl; the other of $R^1$, $R^2$ and $R^3$ is (1–4C)alkyl optionally bearing a carbamoyl substituent, or is (2–4C)alkyl bearing a hydroxy substituent on other than an α-carbon atom; and Y is a physiologically acceptable anion;

(ii) about 0.5 to 10 mole percent of cross-linking structural units of formula IIa and/or IIb:

$$\xleftarrow{} CH_2-CH \xrightarrow{} \quad (IIa)$$
$$\quad | \quad$$
$$CH_2-N^+(R^5)(R^6) \quad Y^-$$
$$\quad | \quad$$
$$\quad X \quad$$
$$\quad | \quad$$
$$CH_2-N^+(R^7)(R^8) \quad Y^-$$
$$\xleftarrow{} CH_2-CH \xrightarrow{}$$

$$\xleftarrow{} CH_2-CH \xrightarrow{} \quad (IIb)$$
$$\quad | \quad$$
$$CH_2-N^+(R^9)(R^{10})-CH_2 \quad Y^-$$
$$\quad | \quad$$
$$\xleftarrow{} CH_2-CH \xrightarrow{}$$

wherein $R^5$, $R^6$, $R^7$ and $R^8$ are independently hydrogen or one of the values of $R^1$, $R^2$ and $R^3$ defined above;

one of $R^9$ and $R^{10}$ is hydrogen or (1–4C)alkyl; the other of $R^9$ and $R^{10}$ has one of the values of $R^1$, $R^2$ and $R^3$ defined above; Y has the meaning defined above; and X is a cross-linking group; and (iii) the remainder of structural propylamine units of formula III:

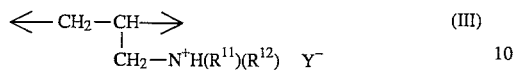

wherein $R^{11}$ and $R^{12}$ are independently hydrogen or one of the values of $R^1$, $R^2$ and $R^3$ defined above; and Y has the meaning defined above; and said derivative D1 having the property of swellling by between about 2 and 200 times in volume in at least one of water, 0.15M aqueous sodium chloride solution, and ethanol.

3. A pharmaceutical composition which comprises: an insoluble swellable polymeric allylammonium derivative comprising in random order:

(i) at least 60 mole percent of quaternary propylammonium structural units of formula I:

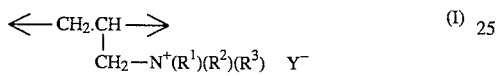

in which the group —N($R^1$)($R^2$)($R^3$) may be —N(CH$_3$)$_3$, —N(CH$_3$)$_2$(butyl), —N(CH$_3$)$_2$(hexyl), —N(CH$_3$)$_2$(octyl) or —N(CH$_3$)$_2$(dodecyl);

(ii) about 3 to 8 mole percent of cross-linking structural units of formula IIa:

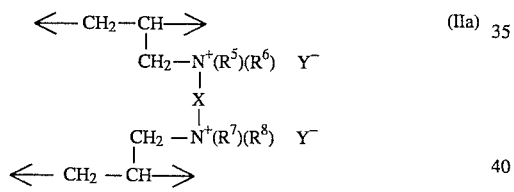

in which the group of the formula —N($R^5$)($R^6$)—X—N($R^7$)($R^8$)— may be
—N(CH$_3$)$_2$.CH$_2$.CH$_2$.CH$_2$.N(CH$_3$)$_2$—,
—NH(CH$_3$).CH$_2$.CH$_2$.CH$_2$.N(CH$_3$)$_2$— or
—NH(CH$_3$).CH$_2$.CH$_2$.CH$_2$.NH(CH$_3$)—; and (iii) the remainder of propylamino structural units of formula III:

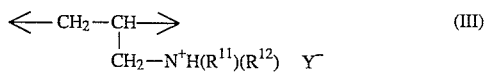

in which the group —NH($R^{11}$)($R^{12}$) is —NH(CH$_3$)$_2$; and Y is halide or a physiologically acceptable organic acid anion; which derivative has the property of swelling by about 3 to 30 times in volume in at least one of water, 0.15M aqueous sodium chloride and ethanol; together with a pharmaceutically acceptable diluent or carrier.

4. A pharmaceutical composition which comprises: an insoluble swellable polymeric allylammonium derivative as claimed in claim 3 selected from the group consisting of:

(a) trimethylene cross-linked poly(N,N-dimethylallylamine), butyl quaternary derivative with about 48% total quaternisation;

(b) self cross-linked poly(N-octylallylamine), dimethyl quaternary derivative with about 66% total quaternisation; and (c) trimethylene cross-linked poly(N,N-dimethylallylamine), octyl/methyl quaternary derivative with about 90% quaternisation; as the salt with a physiologically acceptable anion;

together with a pharmaceutically acceptable diluent or carrier.

* * * * *